United States Patent
Guo et al.

(10) Patent No.: US 11,395,346 B2
(45) Date of Patent: Jul. 19, 2022

(54) RANDOM ACCESS METHOD AND APPARATUS

(71) Applicant: Huawei Technologies Co., Ltd., Shenzhen (CN)

(72) Inventors: Yinghao Guo, Shanghai (CN); Hua Shao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 17/031,506

(22) Filed: Sep. 24, 2020

(65) Prior Publication Data
US 2021/0014902 A1    Jan. 14, 2021

Related U.S. Application Data

(63) Continuation of application No. PCT/CN2019/079921, filed on Mar. 27, 2019.

(30) Foreign Application Priority Data

Mar. 27, 2018 (CN) .......................... 201810260784.X

(51) Int. Cl.
*H04W 74/08* (2009.01)
*H04W 76/27* (2018.01)
(Continued)

(52) U.S. Cl.
CPC ..... *H04W 74/0833* (2013.01); *H04W 56/001* (2013.01); *H04W 72/042* (2013.01); *H04W 76/27* (2018.02)

(58) Field of Classification Search
CPC ........... H04W 74/0833; H04W 56/001; H04W 72/042; H04W 76/27; H04W 74/006;
(Continued)

(56) References Cited

U.S. PATENT DOCUMENTS

2016/0262188 A1   9/2016 Zhang et al.
2019/0335507 A1* 10/2019 Agiwal ............... H04W 28/065
2020/0008247 A1*  1/2020 Kwak .................. H04B 7/0695

FOREIGN PATENT DOCUMENTS

CN        101772181 A       7/2010
CN        102917468 A       2/2013
(Continued)

OTHER PUBLICATIONS

"Remaining issues on RACH procedure," 3GPP TSG RAN WG1 Meeting #92, R1-1802465, Athens, Greece, Total 7 pages, 3rd Generation Partnership Project, Valbonne, France (Feb. 26-Mar. 2, 2018).

(Continued)

*Primary Examiner* — Kyaw Z Soez
(74) *Attorney, Agent, or Firm* — Leydig, Voit & Mayer, Ltd.

(57) ABSTRACT

A random access method and apparatus are provided. In the method, a configuration information element indicating a quantity of downlink signals per random access occasion and a first indication indicating a first downlink signal are sent by a network device to a terminal, and the terminal determines a correspondence between the first downlink signal and a random access occasion is determined based on the configuration information element, and sends a random access preamble via a random access occasion corresponding to the first downlink signal. In this way, the first random access occasion can be relatively accurately determined, and then a random access resource used for random access can be relatively precisely determined.

23 Claims, 8 Drawing Sheets

(51) Int. Cl.
*H04W 56/00* (2009.01)
*H04W 72/04* (2009.01)

(58) Field of Classification Search
CPC . H04W 74/008; H04W 72/046; H04W 48/10; H04W 72/0446; H04W 74/004; H04L 5/0091; H04L 5/0048; H04L 5/0057; H04L 5/005; H04J 11/0069
See application file for complete search history.

(56) References Cited

FOREIGN PATENT DOCUMENTS

| | | |
|---|---|---|
| CN | 106686691 A | 5/2017 |
| KR | 20160122668 A | 10/2016 |
| WO | 2019159304 A1 | 8/2019 |

OTHER PUBLICATIONS

"[D312/322] RACH resources for contention-free RA including BFR," 3GPP TSG-RAN WG2 #101, Athens, Greece, R2-1803777 Revision of R2-1803627, Total 7 pages, 3rd Generation Partnership Project, Valbonne, France (Feb. 26-Mar. 2, 2018).
NTT Docomo, Inc., "Remaining issues on RACH procedure," 3GPP TSG RAN WG1 Meeting AH 1801, Vancouver, Canada, R1-1800654, total 5 pages, 3rd Generation Partnership Project, Valbonne, France (Jan. 22-26, 2018).
Samsung, "Corrections on PRACH procedure," 3GPP TSG RAN WG1 Meeting AH 1801, Vancouver, Canada, R1-1800418, total 9 pages, 3rd Generation Partnership Project, Valbonne, France (Jan. 22- 26, 2018).
"3rd Generation Partnership Project; Technical Specification Group Radio Access Network; Evolved Universal Terrestrial Radio Access (E-UTRA); User Equipment (UE) radio transmission and reception (Release 15)," 3GPP TS 36.101 V15.1.0, total 1636 pages, 3rd Generation Partnership Project, Valbonne, France (Dec. 2017).
Ericsson, "Remaining details of RACH procedure," 3GPP TSG RAN WG1 Meeting #92, Athens, Greece, R1-1802946, total 7 pages, 3rd Generation Partnership Project, Valbonne, France (Feb. 26-Mar. 2, 2018).
"3rd Generation Partnership Project; Technical Specification Group Radio Access Network; Evolved Universal Terrestrial Radio Access (E-UTRA); Physical channels and modulation (Release 15)," 3GPP TS 36.211 V15.0.0, total 219 pages, 3rd Generation Partnership Project, Valbonne, France (Dec. 2017).
Huawei et al.,"RACH Configuration for Msg1 based On-Demand SI Request," 3GPP TSG-RAN2 Meeting #101, Athens, Greece, R2-1803368, total 5 pages, 3rd Generation Partnership Project, Valbonne, France (Feb. 26-Mar. 2, 2018).
"3rd Generation Partnership Project; Technical Specification Group Radio Access Network; Evolved Universal Terrestrial Radio Access (E-UTRA) ;Medium Access Control (MAC) protocol specification (Release 15)," 3GPP TS 36.321 V15.0.0, total 109 pages, 3rd Generation Partnership Project, Valbonne, France (Dec. 2017).
Ericsson, "Signaling of random access parameters [M063]," 3GPP TSG-RAN WG2 #101, Athens, Greece, Tdoc R2-1803995, total 10 pages, 3rd Generation Partnership Project, Valbonne, France (Feb. 26-Mar. 2, 2018).
"3rd Generation Partnership Project; Technical Specification Group Radio Access Network; NR; Physical layer procedures for control (Release 15)," 3GPP TS 38.213 V15.0.0, total 56 pages, 3rd Generation Partnership Project, Valbonne, France (Dec. 2017).
"3rd Generation Partnership Project; Technical Specification Group Radio Access Network; Evolved Universal Terrestrial Radio Access (E-UTRA); Physical layer procedures (Release 15)," 3GPP TS 36.213 V15.0.0, total 493 pages, 3rd Generation Partnership Project, Valbonne, France (Dec. 2017).
"3rd Generation Partnership Project; Technical Specification Group Radio Access Network; NR; Medium Access Control (MAC) protocol specification (Release 15)," 3GPP TS 38.321 V15.0.0, total 55 pages, 3rd Generation Partnership Project, Valbonne, France (Dec. 2017).
"3rd Generation Partnership Project; Technical Specification Group Radio Access Network; NR; Radio Resource Control (RRC) protocol specification (Release 15)," 3GPP TS 38.331 V15.0.0, total 188 pages, 3rd Generation Partnership Project, Valbonne, France (Dec. 2017).
Huawei et al., "Remaining details of RACH Procedures", 3GPP TSG RAN WG1 Meeting #92, Athens, Greece, R1-1801331, 5 pages, 3rd Generation Partnership Project, Valbonne, Fance (Feb. 26-Mar. 2, 2018).

* cited by examiner

RANDOM ACCESS METHOD AND APPARATUS

CROSS-REFERENCE TO RELATED APPLICATIONS

This application is a continuation of International Application No. PCT/CN2019/079921, filed on Mar. 27, 2019, which claims priority to Chinese Patent Application No. 201810260784.X, filed on Mar. 27, 2018. The disclosures of the aforementioned applications are hereby incorporated by reference in their entireties.

TECHNICAL FIELD

This application relates to the field of communications technologies, and in particular, to a random access method and apparatus.

BACKGROUND

Development of mobile service imposes an increasingly high requirement on a data rate and efficiency in wireless communication. In a future wireless communications system, a beamforming technology is used to confine energy of a transmitted signal in a beam direction to improve efficiency of signal sending and receiving.

In a future fifth-generation mobile communications technology (5G) system, a network device may use a plurality of beams to perform information transmission with a terminal that is within coverage of the beams. Before the network device (for example, a base station) performs information transmission with the terminal, the terminal accesses the network device. Currently, the terminal usually accesses the network device through a random access (RA) process. When the terminal is within coverage of a plurality of beams, an existing random access resource determining method may cause a resource waste or a delay, and is no longer applicable.

SUMMARY

Embodiments of this application provide a random access method and apparatus, to relatively accurately determine a random access resource used for random access.

According to a first aspect, this application provides a random access method. The method may be applied to a terminal, or may be applied to a chip inside a terminal. In the method, first indication information is obtained when an association relationship between a downlink signal and a random access occasion is that one downlink signal corresponds to a plurality of random access occasions; or second indication information is obtained when an association relationship between a downlink signal and a random access occasion is that a plurality of downlink signals correspond to one random access occasion. A first random access occasion is determined based on the first indication information and/or the second indication information, and a random access preamble is sent via the determined first random access occasion.

According to a second aspect, this application provides a random access method. The method may be applied to a network device, or may be applied to a chip inside a network device. In the method, a configuration information element is sent, where the configuration information element is used to indicate an association relationship between a downlink signal and a random access occasion. First indication information is sent when it is determined that the association relationship between a downlink signal and a random access occasion is that one downlink signal corresponds to a plurality of random access occasions; and/or second indication information is sent when it is determined that the association relationship between a downlink signal and a random access occasion is that a plurality of downlink signals correspond to one random access occasion, where the first indication information and/or the second indication information are/is used to determine a first random access occasion for sending a random access preamble. The random access preamble sent via the first random access occasion is received.

According to a third aspect, this application provides a random access apparatus, including units or means configured to perform the steps in the first aspect or the second aspect.

According to a fourth aspect, this application provides a random access apparatus, including at least one processor and a memory, where the at least one processor is configured to perform the method provided in the first aspect or the second aspect.

According to a fifth aspect, this application provides a random access apparatus, including at least one processor and an interface circuit, where the at least one processor is configured to perform the method provided in the first aspect or the second aspect.

According to a sixth aspect, this application provides a random access program. When executed by a processor, the program is used to perform the method provided in the first aspect or the second aspect.

According to a seventh aspect, a program product such as a computer-readable storage medium is provided, where the program product includes the program in the sixth aspect.

It can be learned that in the foregoing aspects, when the association relationship between a downlink signal and a random access occasion is that one downlink signal corresponds to a plurality of random access occasions, the first indication information is obtained, and the first random access occasion may be determined based on the first indication information, where the first random access occasion may be used as a random access occasion specifically used to send a random access preamble. When the association relationship between a downlink signal and a random access occasion is that a plurality of downlink signals correspond to one random access occasion, the second indication information is obtained, the downlink signal may be determined based on the second indication information, and the random access occasion corresponding to the downlink signal is determined as the first random access occasion, where the first random access occasion may be used as a random access occasion specifically used to send a random access preamble. In an embodiment of this application, the first random access occasion is determined based on the first indication information and/or the second indication information. In this way, a random access occasion for sending a random access preamble can be relatively accurately determined, and then a random access resource used for random access can be relatively precisely determined. Further, if the terminal determines the downlink signal based on the second indication information, the terminal may determine a downlink signal that is to be indicated to the network device, so that the network device may determine a downlink beam when sending msg2.

In the foregoing aspects, the downlink signal may be a synchronization signal block or a channel state information reference signal.

In a possible design, the first indication information may be used to indicate at least one occasion of the plurality of random access occasions corresponding to one downlink signal.

In an embodiment of this application, when the association relationship between a downlink signal and a random access occasion is that one downlink signal corresponds to a plurality of random access occasions, based on the first indication information that indicates the at least one random access occasion in the plurality of random access occasions as the first random access occasion, a random access occasion for sending a random access preamble may be determined in a plurality of random access occasions for each downlink signal.

The first indication information in an embodiment of this application may be a mask index. Alternatively, the first indication information includes a plurality of bits, each bit corresponds to one of the plurality of random access occasions, and a value of each bit is used to indicate whether a random access occasion that corresponds the each bit is used to send a random access preamble.

In a possible design, different random access masks may be configured for different association relationships between a downlink signal and a random access occasion. Each random access mask may include a correspondence between a value of the first indication information and a random access occasion. The correspondence between a value of the first indication information and a random access occasion, that is included in each random access mask, may be referred to as a first correspondence. The mask index may be a value of bits of the first indication information in the first correspondence.

In a possible implementation, the first correspondence includes:

when the downlink signal corresponds to eight random access occasions, the first indication information is a value of 3-bit information, where each value is used to indicate one random access occasion; or the first indication information is a value of 4-bit information, where eight values are used to indicate eight random access occasions, one value is used to indicate that any random access occasion can be selected from all random access occasions corresponding to the downlink signal, one value is used to indicate an odd-numbered random access occasion, one value is used to indicate an even-numbered random access occasion, and other values are reserved;

when the downlink signal corresponds to four random access occasions, the first indication information is a value of 2-bit information, where each value is used to indicate one random access occasion; or the first indication information is a value of 3-bit information, where four values are used to indicate four random access occasions, one value is used to indicate that any random access occasion can be selected from all random access occasions corresponding to the downlink signal, one value is used to indicate an odd-numbered random access occasion, one value is used to indicate an even-numbered random access occasion, and the other value is reserved; or when the downlink signal corresponds to two random access occasions, the first indication information is a value of 1-bit information, where each value is used to indicate one random access occasion; or the first indication information is a value of 2-bit information, where two values are used to indicate two random access occasions, one value is used to indicate that any random access occasion can be selected from all random access occasions corresponding to the downlink signal, and the other value is reserved.

In another possible implementation, a same random access mask may be configured for different association relationships between a downlink signal and a random access occasion. The random access mask may include a correspondence between a value of the first indication information and a random access occasion. The correspondence between a value of the first indication information and a random access occasion, that is included in the same random access mask, is referred to as a second correspondence. The mask index may be a value of bits of the first indication information in the second correspondence.

In another possible implementation, the second correspondence includes:

the first indication information is a value of four-bit information, where one value is used to indicate that any random access occasion can be selected from all random access occasions corresponding to the downlink signal, two values are used to indicate two random access occasions in two random access occasions corresponding to the downlink signal, two values are reserved or are used to indicate two random access occasions other than the two random access occasions in four random access occasions corresponding to the downlink signal, two values are reserved or are used to indicate four random access occasions other than the four random access occasions in eight random access occasions corresponding to the downlink signal, one value is used to indicate an odd-numbered random access occasion in the four or eight random access occasions corresponding to the downlink signal, one value is used to indicate an even-numbered random access occasion in the four or eight random access occasions corresponding to the downlink signal, and other values are reserved; or the first indication information is a value of three bits, where one value is used to indicate that any random access occasion can be selected from all random access occasions corresponding to the downlink signal, two values are used to indicate two random access occasions in two random access occasions corresponding to the downlink signal, two values are reserved or are used to indicate two random access occasions other than the two random access occasions in four random access occasions corresponding to the downlink signal, two values are reserved or are used to indicate four random access occasions other than the four random access occasions in eight random access occasions corresponding to the downlink signal.

In an embodiment of this application, different or same random access masks are configured for different association relationships between a downlink signal and a random access occasion, so that a random access occasion for a downlink signal can be indicated by using a random access mask. Further, because all downlink signals have a same random access occasion association relationship, in an embodiment of this application, a random access occasion for all downlink signals may be indicated by using a random access mask configuration corresponding to one downlink signal.

In another possible design, in an embodiment of this application, the second indication information may be used to indicate at least one downlink signal of a plurality of downlink signals corresponding to one random access occasion. The first random access occasion for sending the random access preamble is determined based on the second indication information in the following manner: determining a first downlink signal based on the second indication information; and determining a random access occasion corresponding to the first downlink signal as the first random access occasion.

The second indication information includes a plurality of bits, each bit corresponds to one of the plurality of downlink signals, and a value of each bit is used to indicate whether a random access occasion corresponding to a downlink signal that corresponds to the each bit is used to send a random access preamble; or the second indication information is at least one value of N-bit information, and a plurality of values of the N-bit information are used to indicate the plurality of downlink signals.

In an embodiment of this application, when the association relationship between a downlink signal and a random access occasion is that a plurality of downlink signals correspond to one random access occasion, the second indication information indicating the at least one downlink signal in the plurality of downlink signals may be used to determine the first downlink signal in the plurality of downlink signals, and the random access occasion corresponding to the first downlink signal may be used as the first random access occasion. In addition, the terminal may determine the first downlink signal that is to be indicated to the network device, and msg2 is to be delivered via a corresponding first downlink signal. The first downlink signal may be specified by the network device, and the specified downlink signal may be a downlink signal with light load, relatively little interference, and good quality, to facilitate quick access.

In still another possible design, in the foregoing aspects and possible designs of the aspects, K random access preambles may be sent via K random access occasions, where K is a positive integer greater than or equal to 2.

When one downlink signal corresponds to the K random access occasions, the first indication information is used to indicate the K first random access occasions, where the first indication information includes K mask indexes corresponding to the K first random access occasions; or the first indication information includes a plurality of bits, each bit corresponds to one of a plurality of random access occasions, a value of each bit is used to indicate whether a random access occasion that corresponds to the each bit is used to send a random access preamble, and values of K bits in the plurality of bits indicate that random access occasions that correspond to the K bits are used to send random access preambles.

When the K first random access occasions are associated with M downlink signals, where M is a positive integer greater than or equal to 2, the K first random access occasions are determined based on the first indication information and the second indication information.

Further, the second indication information includes a plurality of bits, each bit corresponds to one of a plurality of downlink signals, and a value of each bit is used to indicate whether a random access occasion corresponding to a downlink signal that corresponds to the each bit is used to send a random access preamble, where values of M bits in the plurality of bits are used to indicate that random access occasions corresponding to downlink signals that correspond to the M bits are used to send random access preambles; and the first indication information includes a plurality of bits, each bit corresponds to one of a plurality of random access occasions, a value of each bit is used to indicate whether a random access occasion that corresponds to the each bit is used to send a random access preamble, and values of K/M bits in the plurality of bits indicate that random access occasions that correspond to the K/M bits are used to send random access preambles.

DESCRIPTION OF EMBODIMENTS

The following describes technical solutions in embodiments of this application.

Some terms in this application are first described, to help a person skilled in the art have a better understanding.

(1) A terminal, also referred to as a user equipment (UE), a mobile station (MS), a mobile terminal (MT), or the like, is a device that provides voice connectivity and/or data connectivity for a user and has a network access function, for example, a handheld device or a vehicle-mounted device that has a wireless connection function. Currently, for example, the terminal is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, or the like.

(2) A network device is a device in a wireless network, for example, may be a radio access network (RAN) node that enables a terminal to access the wireless network, and the RAN node may also be referred to as a base station. Currently, for example, the RAN node is a continuously evolved NodeB (gNB), a transmission reception point (TRP), an evolved NodeB (eNB), a radio network controller (RNC), a NodeB (NB), a base station controller (BSC), a base transceiver station (BTS), a home evolved NodeB (for example, a home evolved NodeB or a home NodeB, or a HNB), a baseband unit (BBU), a wireless fidelity (Wi-Fi) access point (AP), or the like. In a network structure, the network device may include a centralized unit (CU) node, a distributed unit (DU) node, or a RAN device including a CU node and a DU node.

(3) "A plurality of" indicates two or more, and another quantifier is similar to this. The term "and/or" describes an association relationship between associated objects and represents that three relationships may exist. For example, A and/or B may represent the following three cases: Only A exists, both A and B exist, and only B exists. A character "/" usually indicates an "or" relationship between associated objects.

(4) The nouns "network" and "system" are usually interchangeably used, but meanings of the terms can be understood by a person skilled in the art. The terms "of", "relevant", and "corresponding" may sometimes be replaced with each other, and meanings expressed by the terms are consistent when differences are not emphasized.

Figure 1:
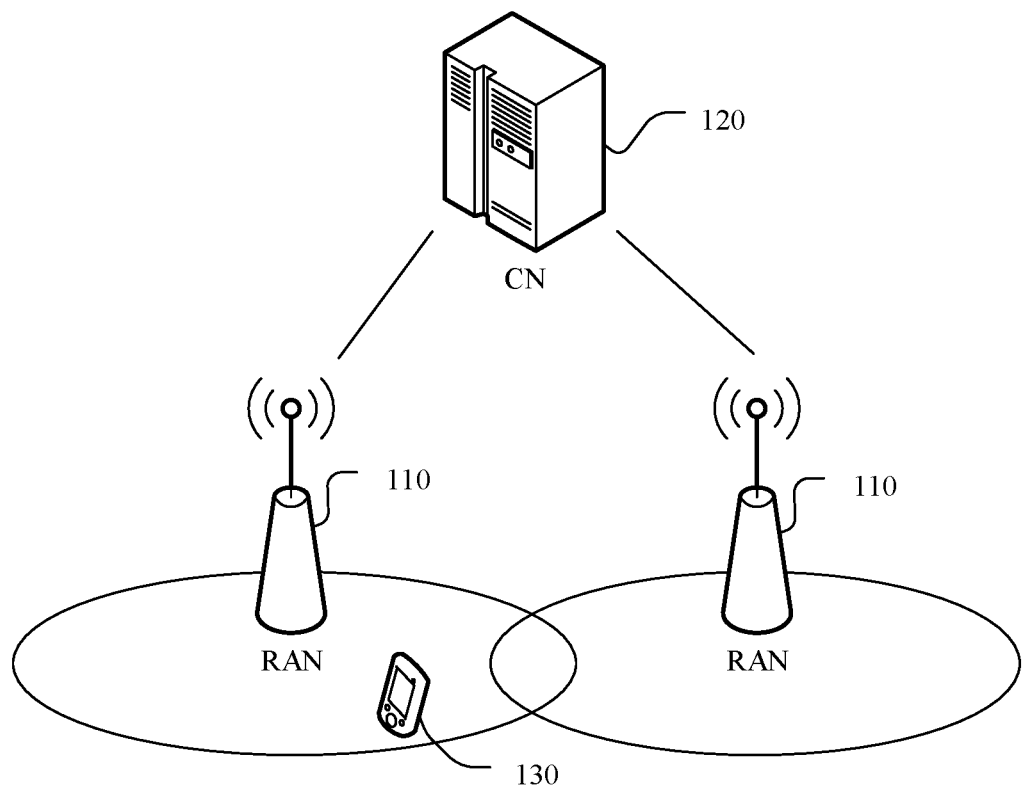
FIG. 1 is an architectural diagram of a communications system according to this application.

FIG. 1 is a schematic diagram of a communications system according to an embodiment of this application. As shown in FIG. 1, a terminal 130 accesses a wireless network, to obtain a service from an external network (for example, the internet) over the wireless network or communicate with another terminal over the wireless network. The wireless network includes a RAN 110 and a core network (CN) 120. The RAN 110 is used to connect the terminal 130 to the wireless network, and the CN 120 is used to manage the terminal device and provide a gateway for communicating with the external network.

Figure 2:
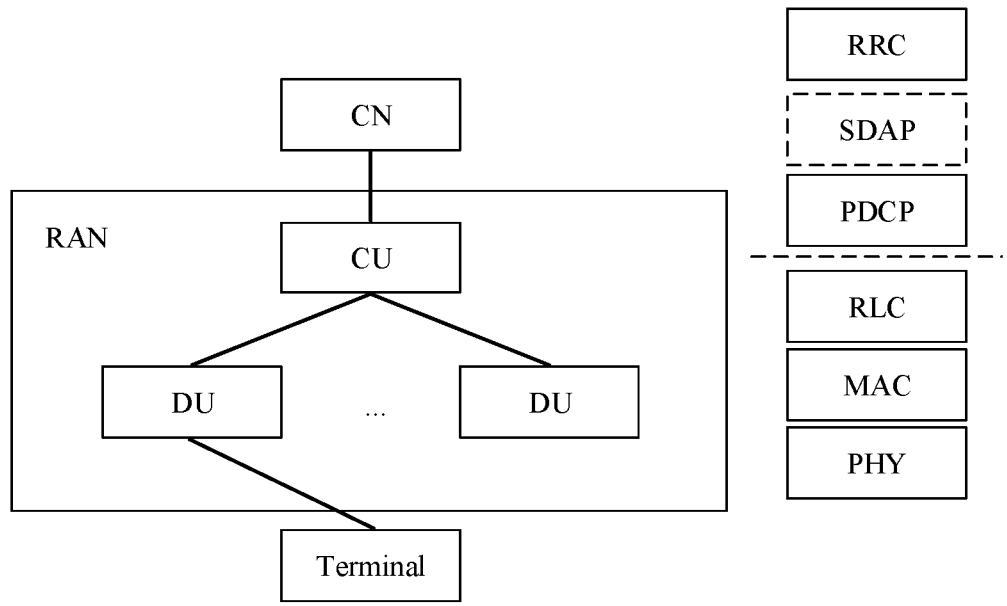
FIG. 2 is a schematic diagram of a network architecture.

FIG. 2 is a schematic diagram of a network architecture according to an embodiment of this application. As shown in FIG. 2, the network architecture includes a CN device and a RAN device. The RAN device includes a baseband apparatus and a radio frequency apparatus. The baseband apparatus may include one node, or may include a plurality of nodes. The radio frequency apparatus may be independently implemented remotely from the baseband apparatus, or may be integrated into the baseband apparatus, or part of the radio frequency apparatus is deployed remotely and the other part of the radio frequency apparatus is integrated into baseband apparatus. For example, in a long term evolution (LTE) communications system, a RAN device (eNB) includes a baseband apparatus and a radio frequency apparatus. The radio frequency apparatus may be remotely disposed relative to the baseband apparatus. For example, a remote radio unit (RRU) is remotely disposed relative to a BBU.

The RAN device may implement functions of protocol layers, such as a radio resource control (RRC) layer, a packet data convergence protocol (PDCP) layer, a radio link control (RLC) layer, a media access control (MAC) layer, and so on, via one or more nodes. For example, in an evolved structure, the RAN device may include a centralized unit (CU) and a distributed unit (DU), and a plurality of DUs may be centrally controlled by one CU. As shown in FIG. 2, the CU and the DU may be divided based on a protocol layer of a wireless network. For example, functions of the PDCP layer and protocol layers above the PDCP layer are set on the CU, and functions of protocol layers below the PDCP layer, such as the RLC layer and the MAC layer, are set on the DU.

Such division based on a protocol layer is merely an example, and division may alternatively be performed based on another protocol layer, for example, the RLC layer. Functions of the RLC layer and protocol layers above the RLC layer are set on the CU, and functions of protocol layers below the RLC layer is set on the DU. Alternatively, division is performed at a protocol layer. For example, part of functions of the RLC layer and functions of protocol layers above the RLC layer are set on the CU, and the other part of functions of the RLC layer and functions of protocol layers below the RLC layer are set on the DU. In addition, division may alternatively be performed in another manner, for example, the division is performed based on a delay. A function whose processing time needs to meet a delay requirement is set on the DU, and a function whose processing time does not need to meet the delay requirement is set on the CU.

In addition, the radio frequency apparatus may not be placed in the DU but is placed remotely from the DU, or may be integrated into the DU, or part of the radio frequency apparatus is deployed remotely and the other part of the radio frequency apparatus is integrated into the DU. This is not limited herein.

Figure 3:
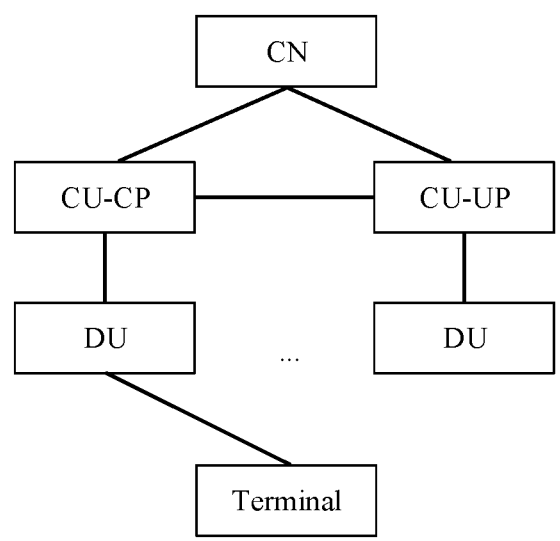
FIG. 3 is a schematic diagram of another network architecture.

Compared with the architecture shown in FIG. 2, further referring to FIG. 3, a control plane (CP) and a user plane (UP) of the CU may be separated and implemented via different entities, which are respectively a control plane CU entity (CU-CP entity) and a user plane CU entity (CU-UP entity).

In the foregoing network architecture, signaling generated by the CU may be sent to the terminal through a DU, or signaling generated by the terminal may be sent to the CU through a DU. The DU may transparently transmit the signaling to the terminal or the CU by directly encapsulating the signaling at a protocol layer without parsing the signaling. In the following embodiments, if transmission of such signaling between the DU and the terminal is involved, that the DU sends or receives the signaling includes this scenario. For example, signaling at the RRC layer or the PDCP layer is finally processed as signaling at a PHY layer and sent to the terminal, or is converted from received signaling at a PHY layer. In this architecture, the signaling at the RRC or the PDCP layer may also be considered to be sent by the DU, or sent by the DU and the radio frequency apparatus.

In the foregoing embodiments, the CU is classified as a network device on a RAN side. In addition, the CU may alternatively be classified as a network device on a CN side. This is not limited herein.

An apparatus in the following embodiments of this application may be located in a terminal or a network device based on functions implemented by the apparatus. When the foregoing CU-DU structure is used, the network device may be a CU node, a DU node, or a RAN device including a CU node and a DU node.

Random access is a manner in which a terminal accesses a network device. In a random access process, the terminal first sends a random access preamble to the network device, to notify the network device that there is a random access request. The network device may estimate a transmission delay between the network device and the terminal, so that the network device calibrates an uplink timing, and notifies the terminal of calibration information via an uplink timing advance command. The preamble may be transmitted on a physical random access channel (PRACH). The network device may notify, via broadcasting system information such as a system information block 1 (SIB 1), the terminal of specific time-frequency resources on which the preamble is allowed to be transmitted.

Currently, there are mainly two different implementations of the random access process: contention-based random access (CBRA) and non-contention-based random access (or Contention-Free based random access, CFRA). Each cell has 64 available preamble sequences, and these sequences may be divided into two parts: One part is used for contention-based random access, and the other part is used for non-contention-based random access. If the terminal performs non-contention-based random access, the terminal uses a preamble directly specified by the network device.

For non-contention-based random access, the network device indicates PRACH resources to the terminal via higher layer signaling, for example, radio resource control (RRC) signaling or physical layer signaling, that is, indicates PRACH resources that can be used to send a preamble. For example, a PRACH mask index is indicated to the terminal by using an information element RACH-ConfigDedicated in RRC signaling, or a PRACH mask index is indicated to the terminal by using a physical downlink control channel (PDCCH) order. The PRACH mask index indicates PRACH resources, in a system frame, on which the terminal can send the preamble. For a correspondence between PRACH mask indexes and PRACH resources, refer to Table 1.

TABLE 1

| PRACH mask index | Allowed PRACH resource (FDD) | Allowed PRACH resource (TDD) |
| --- | --- | --- |
| 0 | All | All |
| 1 | PRACH Resource Index 0 | PRACH Resource Index 0 |
| 2 | PRACH Resource Index 1 | PRACH Resource Index 1 |
| 3 | PRACH Resource Index 2 | PRACH Resource Index 2 |
| 4 | PRACH Resource Index 3 | PRACH Resource Index 3 |
| 5 | PRACH Resource Index 4 | PRACH Resource Index 4 |
| 6 | PRACH Resource Index 5 | PRACH Resource Index 5 |
| 7 | PRACH Resource Index 6 | Reserved |
| 8 | PRACH Resource Index 7 | Reserved |
| 9 | PRACH Resource Index 8 | Reserved |
| 10 | PRACH Resource Index 9 | Reserved |
| 11 | Every even-numbered PRACH in time domain (Every, in the time domain, even PRACH opportunity) First PRACH resource index in frequency domain ($1^{st}$ PRACH Resource Index in subframe) | Every, in the time domain, even PRACH opportunity $1^{st}$ PRACH resource index in subframe |
| 12 | Every odd-numbered PRACH in time domain (Every, in the time domain, odd PRACH opportunity) $1^{st}$ PRACH resource index in subframe | Every, in the time domain, odd PRACH opportunity $1^{st}$ PRACH resource index in subframe |
| 13 | Reserved | $1^{st}$ PRACH resource index in subframe |
| 14 | Reserved | $2^{nd}$ PRACH resource index in subframe |
| 15 | Reserved | $3^{rd}$ PRACH resource index in subframe |

The network device indicates, by using a PRACH mask index, a specific PRACH resource for the terminal to send a preamble, so that the terminal does not collide with another terminal. The PRACH mask index may be 0. In this case, "all" indicates that the network device allocates only the preamble to the terminal, and the PRACH resource may be selected by the terminal. The PRACH mask index may be 11. In this case, the terminal may select a PRACH resource from even-numbered PRACH resources in time domain, where the PRACH resource is the $1^{st}$ PRACH resource in frequency domain.

The PRACH resource may also be referred to as a random access opportunity (for example, a PRACH opportunity). The random access opportunity may be understood as a time-frequency resource used by the terminal to send a random access preamble.

When the terminal is within coverage of a plurality of beams, if an existing random access resource determining method is still used, more air interface resources are needed to indicate a PRACH mask index. For example, there are eight beams, and for each beam, there may be four possible PRACH resources. In this case, at least 32 indexes are required, and at least five bits are required to indicate the indexes. Therefore, a simpler random access resource determining method is introduced. To be specific, an association relationship between a downlink signal, for example, a synchronization signal block (SSB), and a PRACH resource is directly used to determine a PRACH resource. This manner may be used in both FDD and TDD, reducing complexity of random access, and saving air interface resources.

However, the association relationship between an SSB and a PRACH resource is not always a simple one-to-one relationship, so this manner may cause a conflict and lead to a random access failure or an increase in a delay. An embodiment of this application provide a random access method, where the network device delivers indication information when an association relationship between a downlink signal and a PRACH resource is not a one-to-one relationship, for example, is a one-to-multiple or a multiple-to-one relationship, so that the terminal obtains the indication information and determines a PRACH resource based on the indication information, to initiate random access.

Figure 4:
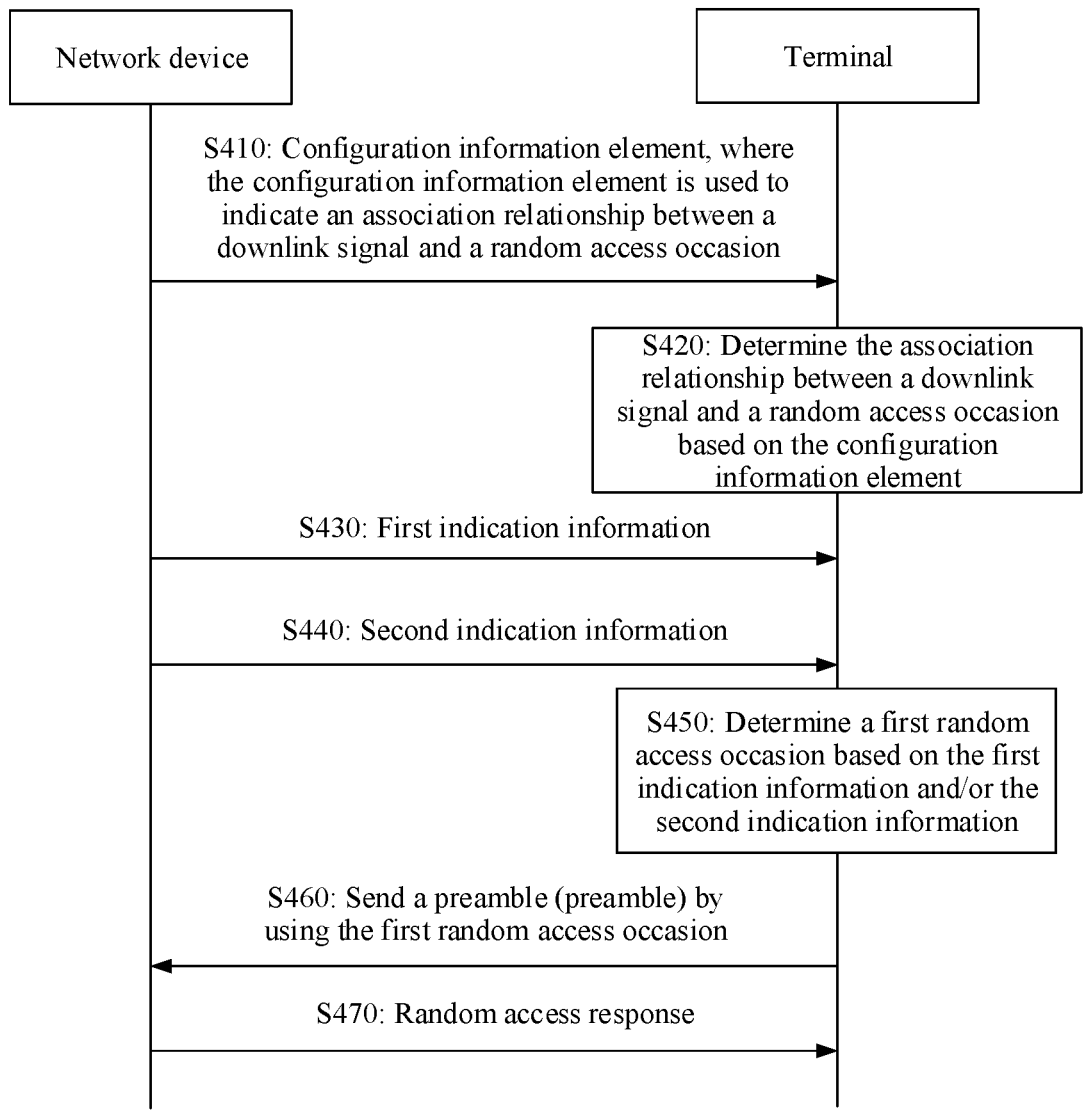
FIG. 4 is an implementation flowchart of a random access method according to an embodiment of this application.

FIG. 4 is an implementation flowchart of a random access method according to an embodiment of this application. As shown in FIG. 4, the method includes the following steps.

S410: A network device sends a configuration information element to a terminal, where the configuration information element is used to indicate an association relationship between a downlink signal and a random access occasion.

The terminal receives the configuration information element from the network device, and performs the following operations:

S420: The terminal determines the association relationship between a downlink signal and a random access occasion (RO) based on the configuration information element.

When the association relationship between a downlink signal and a random access occasion is one-to-multiple, that is, that one downlink signal corresponds to a plurality of random access occasions, the network device sends first indication information, and the terminal performs the following operation S430. When the association relationship between a downlink signal and a random access occasion is multiple-to-one, that is, that a plurality of downlink signals correspond to one random access occasion, the network device sends second indication information, and the terminal performs the following operation S440. The first indication information may be used by the terminal to directly or indirectly determine an RO. When the association relationship between a downlink signals and a random access occasion is one-to-one, the network device does not send indication information to be used by the terminal to determine an RO, and the terminal does not need to receive, from the network device, the indication information to be used to determine the RO, and performs the following operation S450.

S430: The terminal obtains the first indication information from the network device.

S440: The terminal obtains the second indication information from the network device.

S450: The terminal determines an RO. When the association relationship between a downlink signal and a random access occasion is multiple-to-one or one-to-multiple, the terminal determines the RO based on the first indication information or the second indication information. When the association relationship between a downlink signal and a random access occasion is one-to-one, the terminal determines an RO based on a downlink signal.

The RO may also be referred to as a random access resource, for example, a PRACH resource, or a PRACH occasion.

In an embodiment of this application, to distinguish between an RO in the association relationship and the determined RO used to send a preamble, the determined RO used to send a preamble may be referred to as a first RO.

S460: The terminal sends a preamble via the first RO.

The network device receives the preamble sent by the terminal via the first RO.

S470: The network device sends a random access response (RAR). The network device may send the RAR to the terminal, to indicate whether the preamble sent by the terminal via the first RO is received.

Compared with the prior art, in this embodiment, the network device distinguishes different cases of the association relationship between a downlink signal and an RO, and delivers different indication information in different cases. For the different cases of the association relationship between a downlink signal and an RO, the terminal receives the indication information only for a non-one-to-one case, saving air interface resources. In addition, in the non-one-to-one case, the RO used is further specified by using the indication information, reducing a probability of a conflict with another terminal.

The downlink signal may be, for example, an SSB or a channel state information reference signal (CSI-RS) that is usually used by the terminal.

The network device may configure the association relationship between a downlink signal, such as an SSB or CSI-RS, and a random access resource (or referred to as RO). For example, there may be the following three types of association relationships between an SSB and a random access resource: an association relationship between an SSB and a preamble (which may also be referred to as a code), an association relationship between an SSB and an RO, and an association relationship between an SSB and a joint time/frequency and code. For the first association relationship, an association relationship between an SSB and a preamble is configured; for the second association relationship, an association relationship between an SSB and an RO is configured; for the third association relationship, an association relationship among an SSB, a preamble and an RO is configured.

The network device sends a configuration message to the terminal, where the configuration message may include a first configuration information element, and the first configuration information element is used to indicate a time domain position of a random access resource. For example, the first configuration information element is a physical random access channel configuration index (prach-ConfigurationIndex). The terminal determines a random access resource (or referred to as a PRACH resource) in time domain based on the first configuration information element, that is, determines a position of the RO in time domain. The configuration message may include a second configuration information element, where the second configuration information element is used to indicate a frequency domain position of a random access resource. For example, the second configuration information element is a frequency division multiplexing parameter (msg1-FDM) of a message 1 and a frequency domain start point (msg1-FrequencyStart) of the message 1. The terminal determines a random access resource (or referred to as a PRACH resource) in frequency domain based on the second configuration information element, that is, determines a position of the RO in frequency domain.

The configuration message may include a third configuration information element, where the third configuration information element is used to indicate the association relationship between a downlink signal and a random access resource or between a downlink signal and an RO. For example, the third configuration information element is a quantity of SSBs per RACH-Occasion (ssb-perRACH-Occasion). The terminal determines the association relationship between a downlink signal and an RO based on the third configuration information element, that is, determines an association relationship between a downlink signal and a random access resource. The third configuration information element is the configuration information element in S410 and S420. In embodiments of this application, the RACH-Occasion and the RO are often used alternately. It should be understood that meanings expressed by the RACH-Occasion and the RO are the same.

The network device may configure the first to the third configuration information elements for the terminal via one configuration message or via different configuration messages. The configuration message is, for example, higher layer signaling such as RRC signaling.

The association relationship may also be referred to as a correspondence. This is not limited in this application.

The terminal may determine the correspondence between an SSB and an RO and/or a preamble based on the association relationship between an SSB and an RO. For example, ssb-perRACH-Occasion is a configuration information element. A value of ssb-perRACH-Occasion may be greater than 1, equal to 1, or less than 1. If ssb-perRACH-Occasion is greater than 1, for example, one RO corresponds to 2, 4, 8, or 16 SSBs, a value of ssb-perRACH-Occasion may be represented as 2, 4, 8, or 16, and an SSB is associated with both an RO and a preamble, or an SSB is only associated with a preamble. A quantity of preambles in a non-contention-based random access process is equal to a total quantity of preambles minus a quantity of contention-based preambles per SSB (CB-preambleperSSB). If ssb-perRACH-Occasion is less than or equal to 1, for example, one SSB corresponds to 1, 2, 4, or 8 ROs, a value of ssb-perRACH-Occasion may be represented as 1, ½, ¼, or ⅛, and an SSB is only associated with a RACH-Occasion.

A quantity of preambles in a non-contention-based random access process is equal to a total quantity of preambles minus CB-preamblesPerSSB.

It can be learned that one SSB may be associated with a plurality of ROs. Therefore, during random access, the terminal cannot determine an RO specifically used to send a preamble. Alternatively, a plurality of SSBs may be associated with one RO. In this case, the terminal cannot determine an SSB that is to be indicated to the network device.

Therefore, when the association relationship between an SSBs and an RO is that one SSB corresponds to a plurality of ROs, an RO that is in the plurality of ROs and that is specifically used to send a preamble is determined. When the association relationship between an SSB and an RO is that a plurality of SSBs correspond to one RO, an SSB may be determined in the plurality of SSBs, and a preamble is sent via the RO corresponding to the SSB. When the association relationship between an SSB and an RO is that one SSB corresponds to a plurality of ROs, an RO that is in the plurality of ROs and that is specifically used to send a preamble is determined based on the first indication information. When the association relationship between an SSB and an RO is that a plurality of SSBs correspond to one RO, an SSB may be determined based on the second indication information, and a preamble is sent via the RO corresponding to the SSB. According to the random access method provided in this application, a random access occasion can be relatively accurately determined, and then a random access resource used for random access can be relatively precisely determined.

Because the network device generates a plurality of downlink signals, each downlink signal is associated with random access configuration information, and different downlink signals may be carried in different downlink transmit beams for sending, multi-beam processing is implemented. In this way, the technical solution provided in this embodiment of this application can be applied to a multi-beam network similar to a 5G system.

It may be understood that this embodiment of this application is described by using an example in which the solution is applied to a 5G NR system, but a system is not limited to the 5G NR system. The solution in this application may be applied as long as a resource needs to be allocated by one of two communication parties.

It may be further understood that, this embodiment of this application is described by using an example in which the downlink signal is an SSB, but is not limited to the SSB. For example, the downlink signal may alternatively be a CSI-RS. An implementation in which the downlink signal is a CSI-RS is similar to the implementation in which the downlink signal is an SSB. Details are not described again.

In a possible example, values of ssb-perRACH-Occasion corresponding to all SSBs are the same, and a value of ssb-perRACH-Occasion may be {⅛, ¼, ½, 1, 2, 4, 8, 16}. When the value of ssb-perRACH-Occasion is less than 1, the association relationship between an SSB and an RO is that one SSB corresponds to a plurality of ROs. In this case, an RO may be determined in the plurality of ROs. When the value of ssb-perRACH-Occasion is greater than 1, the association relationship between an SSB and an RO is that a plurality of SSBs correspond to one RO. In this case, an SSB may be determined in the plurality of SSBs.

In following embodiments of this application, random access implementation processes separately for cases in which the value of ssb-perRACH-Occasion is less than 1 and the value of ssb-perRACH-Occasion is greater than or equal to 1 are described.

First, in an embodiment of this application, the random access implementation process for the case in which the value of ssb-perRACH-Occasion is less than 1 is described.

Figure 5:
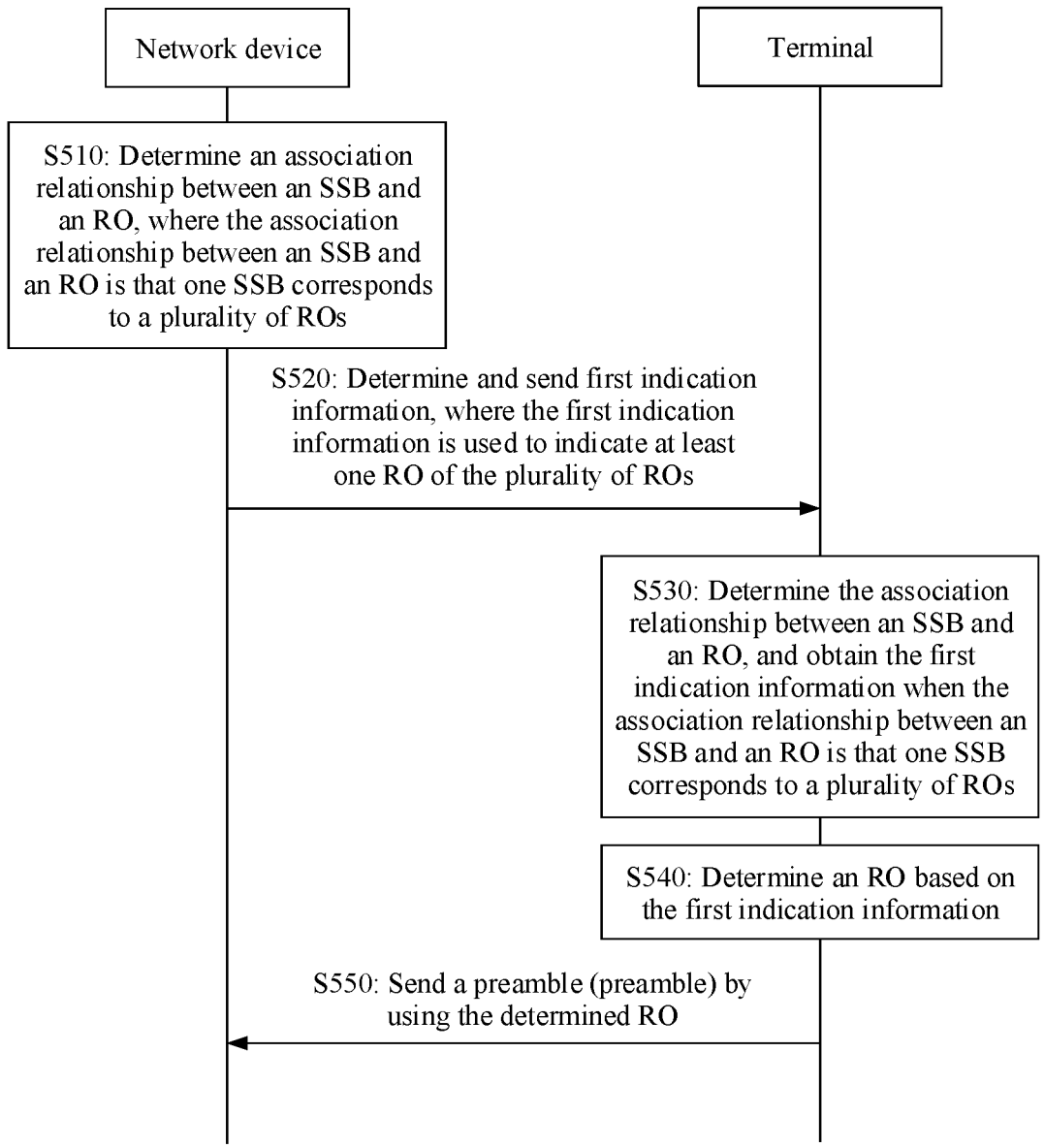
FIG. 5 is an implementation flowchart of another random access method according to an embodiment of this application.

FIG. 5 is an implementation flowchart of a random access method according to an embodiment of this application. As shown in FIG. 5, the method includes the following steps.

S510: A network device determines an association relationship between an SSB and an RO, where the association relationship between an SSB and an RO is that one SSB corresponds to a plurality of ROs.

S520: The network device determines and sends first indication information, where the first indication information is used to indicate at least one RO of the plurality of ROs.

In a possible implementation, an RO mask (MASK) available for each SSB may be determined based on the association relationship between an SSB and an RO. The first indication information may be a mask index (MASK INDEX). An RO may be determined in the plurality of ROs based on the mask index, and is indicated to a terminal. The terminal may send a random access preamble via the determined RO.

In another possible implementation, the first indication information may include a plurality of bits, each bit corresponds to one of a plurality of ROs, and a value of each bit is used to indicate whether an RO that corresponds the each bit is used to send a preamble.

Different RO masks may be configured for different association relationships between an SSB and an RO. The RO mask may include a correspondence between a value of the first indication information and a first RO. In an embodiment of this application, each of correspondences between values of the first indication information and first ROs in different RO masks may be referred to as a first correspondence. The terminal may determine the first RO based on the first correspondence. The network device may determine, based on the correspondence, the first indication information corresponding to the first RO. The mask index may be a value of the first indication information in the first correspondence.

Specifically, that different RO masks are configured for different association relationships may be understood as that the corresponding first correspondence is determined for each of three association relationships in which values of ssb-perRACH-Occasion are {⅛, ¼, ½}. Specifically, when a value of ssb-perRACH-Occasion is ⅛, the value of the first indication information is a value of three bits, where each value is used to indicate one RO; or the value of the first indication information is a value of four bits, where eight values are used to indicate eight ROs, one value is used to indicate that any RO can be selected from all ROs corresponding to the downlink signal, one value is used to indicate an odd-numbered RO, one value is used to indicate an even-numbered RO, and other values are reserved.

When a value of ssb-perRACH-Occasion is ¼, the value of the first indication information is a value of two bits, where each value is used to indicate one RO; or the value of the first indication information is a value of three bits, where four values are used to indicate four ROs, one value is used to indicate that any RO can be selected from all ROs corresponding to the downlink signal, one value is used to indicate an odd-numbered RO, one value is used to indicate an even-numbered RO, and the other value is reserved.

When a value of ssb-perRACH-Occasion is ½, the value of the first indication information is a value of one bit, where each value is used to indicate one RO; or the value of the first indication information is a value of two bits, where two values are used to indicate two ROs, one value is used to indicate that any RO can be selected from all ROs corresponding to the downlink signal, and the other value is reserved.

The first correspondence may be represented in a form of a table. Therefore, a corresponding table needs to be determined for each of the three association relationships in which the values of ssb-perRACH-Occasion are {⅛, ¼, ½}. Examples are as follows:

When the value of ssb-perRACH-Occasion is ⅛, the first indication information is a PRACH mask index (PRACH Mask Index), and the PRACH mask index is indicated by using 4 bits. A specific RO mask configuration manner may include a correspondence between a PRACH mask index and an allowed RO (Allowed RACH occasion). For details, refer to Table 2.

TABLE 2

| PRACH mask index | Allowed RACH occasion |
| --- | --- |
| 0 | All |
| 1 | RACH occasion index 1 |
| 2 | RACH occasion index 2 |
| 3 | RACH occasion index 3 |
| 4 | RACH occasion index 4 |
| 5 | RACH occasion index 5 |
| 6 | RACH occasion index 6 |
| 7 | RACH occasion index 7 |
| 8 | RACH occasion index 8 |
| 9 | Every even RACH occasion |
| 10 | Every odd RACH occasion |
| 11 | Reserved |
| 12 | Reserved |
| 13 | Reserved |
| 14 | Reserved |
| 15 | Reserved |

Table 2 may indicate 16 PRACH mask indexes. Eight PRACH masks indexes are separately used to indicate a specific RACH-Occasion to be used in eight RACH-Occasions. One PRACH mask index is used to indicate "all", to be specific, any RO may be selected from all ROs. Two PRACH mask indexes are respectively used to indicate that an even-numbered RACH-Occasion or an odd-numbered RACH-Occasion may be used. Remaining PRACH mask indexes are reserved. Alternatively, when the value of ssb-perRACH-Occasion is ⅛, the PRACH mask index is indicated by using three bits. For a specific RO mask configuration manner, refer to Table 3.

TABLE 3

| PRACH mask index | Allowed RACH occasion |
| --- | --- |
| 0 | RACH occasion index 1 |
| 1 | RACH occasion index 2 |
| 2 | RACH occasion index 3 |
| 3 | RACH occasion index 4 |
| 4 | RACH occasion index 5 |
| 5 | RACH occasion index 6 |
| 6 | RACH occasion index 7 |
| 7 | RACH occasion index 8 |

In Table 3, eight PRACH mask indexes may be indicated, and all of the eight PRACH mask indexes are used to indicate ROs.

When the value of ssb-perRACH-Occasion is ¼, the PRACH mask index is indicated by using three bits. For a specific RO mask configuration manner, refer to Table 4.

TABLE 4

| PRACH mask index | Allowed RACH occasion |
| --- | --- |
| 0 | All |
| 1 | RACH occasion index 1 |
| 2 | RACH occasion index 2 |
| 3 | RACH occasion index 3 |
| 4 | RACH occasion index 4 |
| 5 | Every even RACH occasion |
| 6 | Every odd RACH occasion |
| 7 | Reserved |

Table 4 may indicate eight PRACH mask indexes. Specifically, four PRACH masks indexes are separately used to indicate a specific RACH-Occasion to be used in four RACH-Occasions. One PRACH mask index is used to indicate "all", to be specific, any RACH-Occasion may be used in all RACH-Occasions. Two PRACH mask indexes are respectively used to indicate that an even-numbered RACH-Occasion or an odd-numbered RACH-Occasion may be used. A remaining PRACH mask index is reserved.

When the value of ssb-perRACH-Occasion is ¼, the PRACH mask index is indicated by using two bits. For a specific RO mask configuration manner, refer to Table 5.

TABLE 5

| PRACH mask index | Allowed RACH occasion |
| --- | --- |
| 0 | RACH occasion index 1 |
| 1 | RACH occasion index 2 |
| 2 | RACH occasion index 3 |
| 3 | RACH occasion index 4 |

Table 5 may indicate four PRACH mask indexes, and all of the four PRACH mask indexes are used to indicate ROs.

When the value of ssb-perRACH-Occasion is ½, the PRACH mask index is indicated by using two bits. For a specific RO mask configuration manner, refer to Table 6.

TABLE 6

| PRACH mask index | Allowed RACH occasion |
| --- | --- |
| 0 | All |
| 1 | RACH occasion index 1 |
| 2 | RACH occasion index 2 |
| 3 | Reserved |

Table 6 may indicate four PRACH mask indexes. Specifically, two PRACH masks indexes are separately used to indicate a specific RACH-Occasion to be used in two RACH-Occasions. One PRACH mask index is used to indicate "all", to be specific, any RACH-Occasion may be selected from all RACH-Occasions. A remaining PRACH mask index is reserved.

When the value of ssb-perRACH-Occasion is ½, the PRACH mask index is indicated by using one bit. For a specific RO mask configuration manner, refer to Table 7.

TABLE 7

| PRACH mask index | Allowed RACH occasion |
| --- | --- |
| 0 | RACH occasion index 1 |
| 1 | RACH occasion index 2 |

Table 7 may indicate two PRACH mask indexes, and both of the two PRACH mask indexes are used to indicate ROs.

Alternatively, a same RO mask may be configured for different association relationships between an SSBs and an RO. The RO mask may include a correspondence between a value of the first indication information and a first RO. In an embodiment of this application, a correspondence between a value of the first indication information and a first RO in the same RO mask may be referred to as a second correspondence. The terminal may determine the first RO based on the second correspondence. The network device may determine, based on the correspondence, the first indication information corresponding to the first RO. The mask index is a value of the first indication information in the second correspondence.

Specifically, that a same RO mask is configured for different association relationships may be understood as that the determined second correspondence may be used to indicate an RO in each of three association relationships in which values of ssb-perRACH-Occasion are {⅛, ¼, ½}. For example, the second correspondence may be indicated by using four bits. The PRACH mask index is a value of four bits, and there are 16 values in total, where one value is used to indicate that any RO can be selected from all ROs corresponding to the SSB, two values are used to indicate two ROs in two ROs corresponding to the SSB, two values are reserved or are used to indicate two ROs other than the two ROs in four ROs corresponding to the SSB, two values are reserved or are used to indicate four ROs other than the four ROs in eight ROs corresponding to the SSB, one value is used to indicate an odd-numbered RO in the four or eight ROs corresponding to the SSB, one value is used to indicate an even-numbered RO in the four or eight ROs corresponding to the SSB, and other values are reserved. The second correspondence may be indicated by using three bits. The PRACH mask index is a value of three bits, and there are eight values in total, where one value is used to indicate that any RO can be selected from all ROs corresponding to the SSB, two values are used to indicate two ROs in two ROs corresponding to the SSB, two values are reserved or are used to indicate two ROs other than the two ROs in four ROs corresponding to the SSB, and two values are reserved or are used to indicate four ROs other than the four ROs in eight ROs corresponding to the SSB.

The second correspondence may be represented in a form of a table. Therefore, an example of a table for each of the three association relationships in which the values of ssb-perRACH-Occasion are {⅛, ¼, ½} is shown in Table 8 or Table 9:

TABLE 8

| PRACH mask index | Allowed RACH occasion |
| --- | --- |
| 0 | All |
| 1 | RACH occasion index 1 |
| 2 | RACH occasion index 2 |
| 3 | RACH occasion index 3/Reserved |
| 4 | RACH occasion index 4/Reserved |
| 5 | RACH occasion index 5/Reserved |
| 6 | RACH occasion index 6/Reserved |
| 7 | RACH occasion index 7/Reserved |
| 8 | RACH occasion index 8/Reserved |
| 9 | Every even RACH occasion/Reserved |
| 10 | Every odd RACH occasion/Reserved |
| 11 | Reserved |
| 12 | Reserved |
| 13 | Reserved |
| 14 | Reserved |
| 15 | Reserved |

In Table 8, the second correspondence is indicated by using four bits. An index used to indicate all RACH-Occasions is fixed in the table and is applicable to all ssb-perRACH-Occasions. An index used to indicate an odd-numbered RACH-Occasion or an even-numbered RACH-Occasion is applicable only to ssb-perRACH-Occasion with a value of ¼ or ⅛. All entries in Table 8 are applicable to ssb-perRACH-Occasion with a value of ⅛. When the value of ssb-perRACH-Occasion is ¼, PRACH mask indexes 5 to 8 are not applicable. When the value of ssb-perRACH-Occasion is ½, PRACH mask indexes 3 to 8 in Table 8 are not applicable. When the value of ssb-perRACH-Occasion is 1, only a PRACH mask index 1 in Table 8 is available.

TABLE 9

| PRACH mask index | Allowed RACH occasion |
| --- | --- |
| 0 | RACH occasion index 1 |
| 1 | RACH occasion index 2 |
| 2 | RACH occasion index 3/Reserved |
| 3 | RACH occasion index 4/Reserved |
| 4 | RACH occasion index 5/Reserved |
| 5 | RACH occasion index 6/Reserved |
| 6 | RACH occasion index 7/Reserved |
| 7 | RACH occasion index 8/Reserved |

In Table 9, the second correspondence is indicated by using three bits. All entries in Table 9 are applicable to ssb-perRACH-Occasion with a value of ⅛. When the value of ssb-perRACH-Occasion is ¼, PRACH mask indexes 5 to 8 are not applicable. When the value of ssb-perRACH-Occasion is ½, PRACH mask indexes 3 to 8 in Table 9 are not applicable. When the value of ssb-perRACH-Occasion is 1, only a PRACH mask index 1 in Table 9 is available.

S530: The terminal determines the association relationship between an SSB and an RO, and obtains the first indication information when the association relationship between an SSB and an RO is that one SSB corresponds to a plurality of ROs.

Specifically, the first indication information may be a PRACH mask index. The terminal may obtain the PRACH mask index when determining that the association relationship between an SSB and an RO is that one SSB corresponds to a plurality of ROs.

S540: Determine an RO based on the first indication information (the PRACH mask index).

When the RO is to be determined based on the PRACH mask index, the RO may be determined based on the foregoing RO indicated by the related PRACH mask index. The RO indicated by the PRACH mask index is not described herein again.

S550: Send a preamble via the determined RO.

In this embodiment of this application, when the association relationship between an SSB and an RO is that one SSB corresponds to a plurality of ROs, the network device determines and sends the first indication information indicating the at least one RO of the plurality of ROs, and the terminal may determine, for each SSB by obtaining the first indication information, the RO used to send a preamble in the plurality of ROs. Further, because all SSBs have a same RO association relationship, in an embodiment of this application, an RO for all SSBs may be indicated by using an RO mask configuration corresponding to one SSB. For example, there are eight beams (SSB), and there may be four possible PRACH resources for each beam. In this case, the possible PRACH resources may be indicated by using four indexes, and there is no need to use 32 indexes to indicate the possible PRACH resources, reducing a quantity of bits for indicating the indexes.

Next, in an embodiment of this application, the random access implementation process for the case in which the value of ssb-perRACH-Occasion is greater than or equal to 1 is described.

Figure 6:
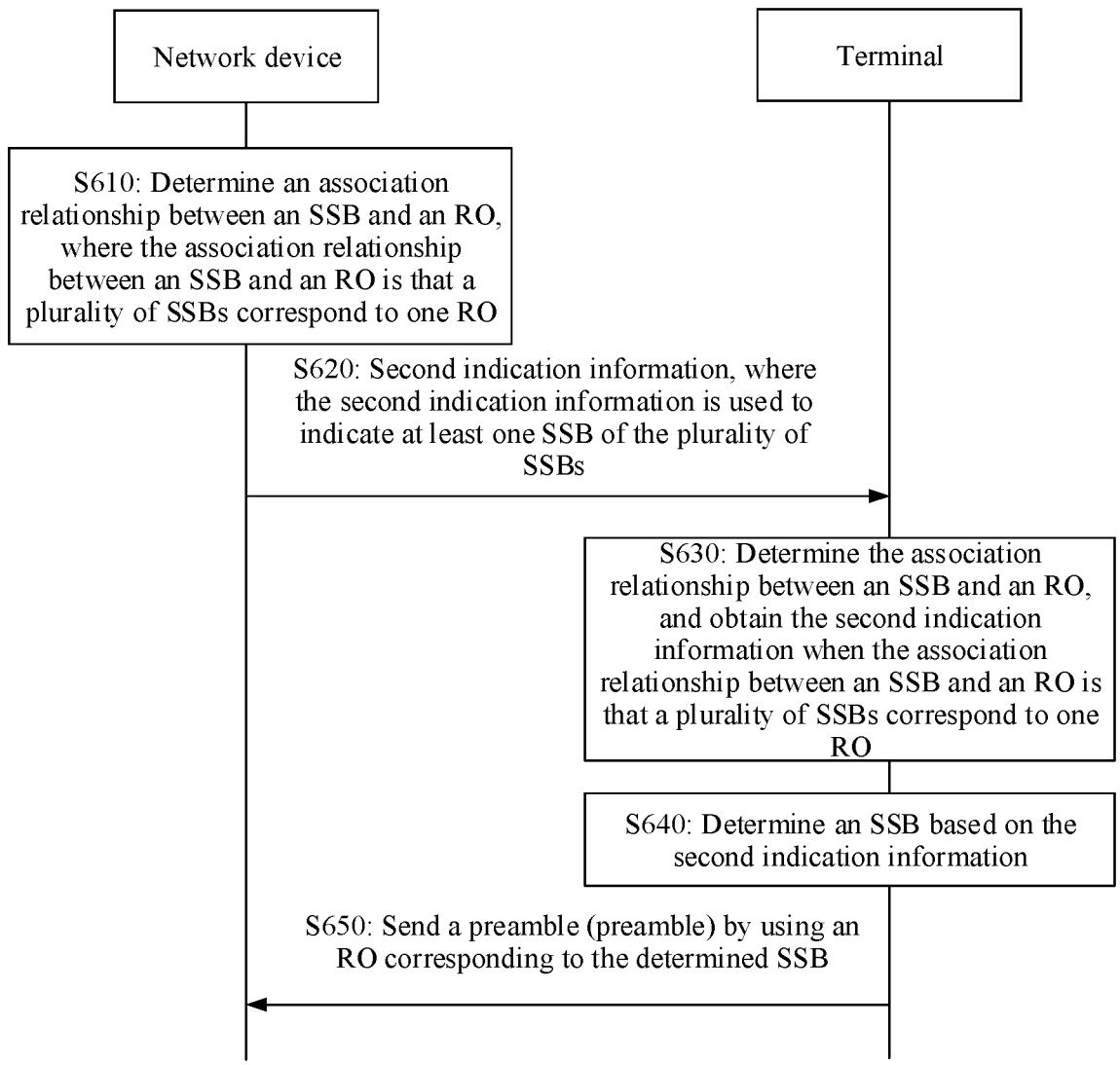
FIG. 6 is an implementation flowchart of still another random access method according to an embodiment of this application.

FIG. 6 is an implementation flowchart of another random access method according to an embodiment of this application. As shown in FIG. 6, the method includes the following steps.

S610: A network device determines an association relationship between an SSB and an RO, where the association relationship between an SSB and an RO is that a plurality of SSBs correspond to one RO, or certainly, one SSB may correspond to one RO.

S620: The network device determines and sends second indication information, where the second indication information is used to indicate at least one SSB of a plurality of SSBs corresponding to one RO.

The second indication information may include a plurality of bits, each bit corresponds to one of the plurality of SSBs, and a value of each bit is used to indicate whether an RO corresponding to a SSB that corresponds to the each bit is used to send a preamble.

Specifically, in an embodiment of this application, when a plurality of SSBs correspond to one RO, a value of ssb-preRACH-Occasion may be {2, 4, 8, 16}. It is assumed that the value of ssb-preRACH-Occasion is X, the second indication information may be a bitmap including X bits, where a set bit in the bitmap indicates that the SSB that corresponds to the set bit can be used. X is a quantity of SSBs corresponding to one RO. Specifically, a value of X is 2, 4, 8, or 16, or may be 1. For example, in a solution, X bits are used to indicate an SSB or some SSBs to be used by a terminal. If the terminal reports an SSB to the network device, the network device may determine a downlink beam used to send a message 2 (msg2) to the terminal, and deliver msg2 via a corresponding SSB. If an SSB is indicated to be used, a bit of a mask corresponding to the SSB is set to 1; if an SSB is indicated not to be used, a bit of a mask corresponding to the SSB is set to 0.

Alternatively, the second indication information is at least one value of N-bit information, and a plurality of values of the N-bit information is used to indicate the plurality of downlink signals. For example, the second indication information may alternatively be a bit value corresponding to a logarithmic value of X bits. For example, a log 2(X) bit is used to indicate an SSB to be used by the terminal for access, and corresponding msg2 is delivered via a corresponding SSB beam. For example, the terminal measures and reports X=16 SSBs that can be received, and the network device indicates, by using a 4-bit mask, an SSB associated with random access performed by the terminal. A 4-bit SSB mask indication manner is shown in Table 10, and a maximum of 16 SSBs may be indicated.

TABLE 10

| SSB mask | Corresponding SSB |
| --- | --- |
| 0 | SSB 0 |
| 1 | SSB 1 |
| 2 | SSB 2 |
| 3 | SSB 3 |
| 4 | SSB 4 |
| 5 | SSB 5 |
| 6 | SSB 6 |

TABLE 10-continued

| SSB mask | Corresponding SSB |
| --- | --- |
| 7 | SSB 7 |
| 8 | SSB 8 |
| 9 | SSB 9 |
| 10 | SSB 10 |
| 11 | SSB 11 |
| 12 | SSB 12 |
| 13 | SSB 13 |
| 14 | SSB 14 |
| 15 | SSB 15 |

When X=1, 2, 4, or 8, a subset in Table 10 may be used. Alternatively, four bits are fixedly used for indication. When X=1, 2, 4, or 8, a redundant entry in Table 9 is a reserved field.

S630: The terminal determines the association relationship between an SSB and an RO, and obtains the second indication information when determining that the association relationship between an SSB and an RO is that a plurality of SSBs corresponds to one RO.

In an embodiment of this application, the second indication information may include a plurality of bits, each bit corresponds to one of the plurality of SSBs, and a value of each bit is used to indicate whether an RO corresponding to a SSB that corresponds to the each bit is used to send a random access preamble; or the second indication information is at least one value of N-bit information, and a plurality of values of the N-bit information are used to indicate the plurality of SSBs.

S640: Determine, as a first SSB, at least one SSB in the plurality of SSBs based on the second indication information.

When the second indication information includes a plurality of bits, each bit corresponds to one of the plurality of SSBs, and an RO corresponding to an SSB indicated by a value is determined to be used to send a preamble. For example, when the second indication information is a bitmap including X bits, a set bit in the bitmap indicates that an RO corresponding to the SSB that corresponds to the set bit is used to send a preamble. Alternatively, when the second indication information is at least one value of N-bit information, it may be determined, based on a plurality of values of the N-bit information, that ROs corresponding to a plurality of SSBs are used to send preambles. For example, when the second indication information is a bit value corresponding to a logarithmic value of X bits, an RO corresponding to an SSB indicated by the bit value is used to send a preamble.

S650: Use the RO corresponding to the determined first SSB as a first RO, and send a preamble via the determined first RO.

In this embodiment of this application, when the association relationship between an SSB and an RO is that a plurality of SSBs corresponds to one RO, the network device determines and sends the second indication information indicating the at least one SSB of the plurality of SSBs as the first SSB, and the terminal may determine the first SSB in the plurality of SSBs by obtaining the second indication information, and use the RO corresponding to the determined first SSB as the first RO. In addition, the terminal may determine an SSB that is to be indicated to the network device. msg2 is to be delivered via a corresponding SSB, where the SSB is specified by the network device. The specified SSB may be an SSB with light load, relatively little interference, and good quality, to facilitate quick access.

In the foregoing embodiments of this application, regardless of whether the value of ssb-perRACH-Occasion is less than 1, or the value of ssb-perRACH-Occasion is greater than or equal to 1, a network side configures that the terminal may send a plurality of random access preambles in a random access process. For example, if a RACH-Occasion mask is used to indicate sending of multiple msg1, it may be determined that a plurality of RACH-Occasions are used to send preambles.

In an embodiment of this application, an example in which K ROs are used to send K random access preambles, and K is a positive integer greater than or equal to 2 is used for description. In the embodiment of this application, for example, the ROs corresponding to the K random access preambles may be determined in the following manner:

Solution 1: The association relationship between an SSB and an RO is that one SSB corresponds to K ROs, that is, the K ROs are associated with a same SSB. For each RO, a corresponding RACH-Occasion mask is configured, and a total of K RO masks are configured. The first indication information is used to indicate the K first ROs, where the first indication information includes K mask indexes corresponding to the K first ROs. For a specific implementation of a process of determining each first RO, refer to a determining manner with an RO mask when the value of ssb-perRACH-Occasion is less than 1 in the foregoing embodiment. Alternatively, the first indication information includes a plurality of bits, each bit corresponds to one of a plurality of ROs, a value of each bit is used to indicate whether a corresponding RO is used to send a preamble, and values of K bits in the plurality of bits indicate that ROs that correspond to the K bits are used to send preambles. For example, an 8-bit bitmap is used to indicate ROs on which preambles can be sent. A bit corresponding to an RO that can be used to send a preamble is set to 1; otherwise, a bit corresponding to an RO that cannot be used to send a preamble is set to 0. For example, if K=8, and RO mask=10110010, the UE sends preambles at ROs with RO indexes of 0, 2, 3, and 6.

Solution 2: The K ROs are associated with M SSBs, where M is a positive integer greater than or equal to 2, and the K first ROs may be determined based on the first indication information and the second indication information.

In a possible implementation, the second indication information includes a plurality of bits, each bit corresponds to one of a plurality of downlink signals, and a value of each bit is used to indicate whether a random access occasion corresponding to a downlink signal that corresponds to the each bit is used to send a random access preamble, where values of M bits in the plurality of bits are used to indicate that random access occasions corresponding to downlink signals that correspond to the M bits are used to send random access preambles; and the first indication information includes a plurality of bits, each bit corresponds to one of a plurality of random access occasions, a value of each bit is used to indicate whether a random access occasion that corresponds to the each bit is used to send a random access preamble, and values of K/M bits in the plurality of bits indicate that random access occasions that correspond to the K/M bits are used to send random access preambles. For example, K=8, M=2, and each SSB is associated with four ROs. The base station configures four SSBs, and each SSB is associated with eight ROs. In this case, RO mask=0101+01010101 means that preambles are sent at the first, third, fifth, and seventh ROs associated with the first and third SSBs. There are a total of eight ROs for sending preambles.

It may be understood that implementation processes of the foregoing solution 1 and solution 2 in the embodiments of this application are merely examples for description. In an actual implementation process, specific forms of the first indication information and the second indication information may be combined randomly. For example, the second indication information is a bitmap, and the first indication information is a bitmap or a mask index. For another example, the second indication information is a value, and the first indication information is a bitmap or a mask index.

The foregoing mainly describes the solutions provided in the embodiments of this application from a perspective of interaction between the terminal and the network device. It may be understood that to implement the foregoing functions, the terminal and the network device include corresponding hardware structures and/or software modules for performing the functions. With reference to units and algorithm steps of each example described in the embodiments disclosed in this application, the embodiments of this application may be implemented in a form of hardware or a combination of hardware and computer software. Whether a function is performed by hardware or hardware driven by computer software depends on particular applications and design constraints of the technical solutions. A person skilled in the art may use different methods for each particular application to implement the described functions, but it should not be construed that the implementation goes beyond the scope of the technical solutions of the embodiments of this application.

In an embodiment of this application, division into functional units may be performed on the terminal and the network device based on the foregoing method examples. For example, each functional unit may be obtained through division based on a corresponding function, or two or more functions may be integrated into one processing unit. The integrated unit may be implemented in a form of hardware, or may be implemented in a form of a software functional unit.

Based on a same inventive concept, an embodiment of this application embodiment further provide an apparatus configured to implement any one of the foregoing methods. For example, an apparatus is provided, and includes units (or means) configured to implement the steps performed by the terminal in any one of the foregoing methods. For another example, another apparatus is further provided, and includes units (or means) configured to implement the steps performed by the network device in any one of the foregoing methods.

Figure 7:
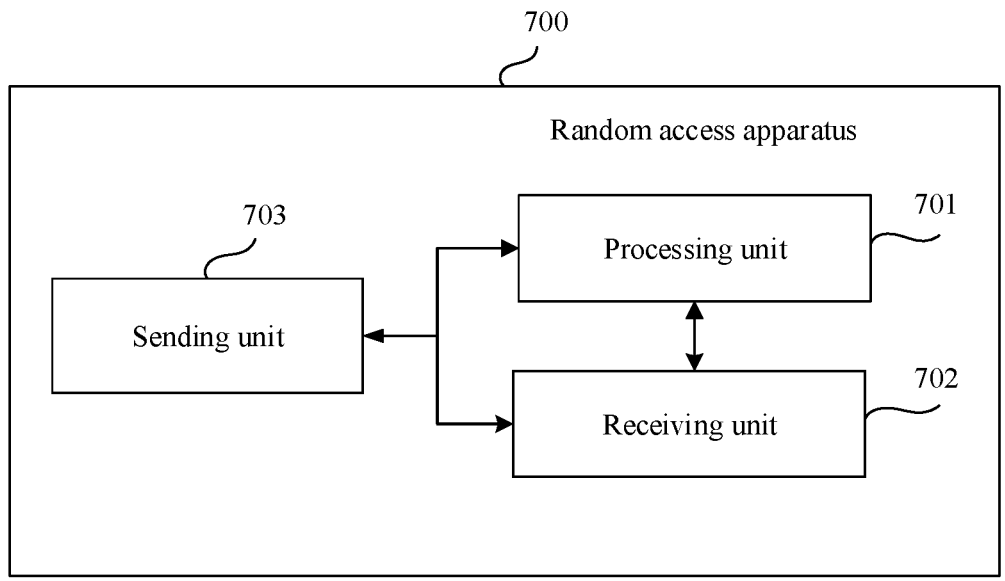
FIG. 7 is a schematic diagram of a random access apparatus according to an embodiment of this application.

In a possible implementation, the embodiments of this application provide a random access apparatus 700. The random access apparatus 700 may be applied to a terminal. FIG. 7 is a schematic structural diagram of the random access apparatus 700 according to an embodiment of this application. Referring to FIG. 7, the random access apparatus 700 includes a processing unit 701, a receiving unit 702, and a sending unit 703. The processing unit 701 is configured to determine an association relationship between an SSB and an RO. The receiving unit 702 obtains first indication information when the processing unit 701 determines that the association relationship between an SSB and an RO is that one SSB corresponds to a plurality of ROs. Alternatively, the receiving unit 702 obtains second indication information when the processing unit 701 determines that the association relationship between an SSB and an RO information when the processing unit 701 determines that the association relationship between an SSB and an RO is that one SSB corresponds to a plurality of ROs. Alternatively, the receiving unit 702 obtains second indication information when the processing unit 701 determines that the association relationship between an SSB and an RO is that a plurality of SSBs correspond to one RO. The processing unit 701 determines a first RO based on the first indication information and/or the second indication information. The sending unit 703 is configured to send a preamble via the first RO determined by the processing unit 701.

Figure 8:
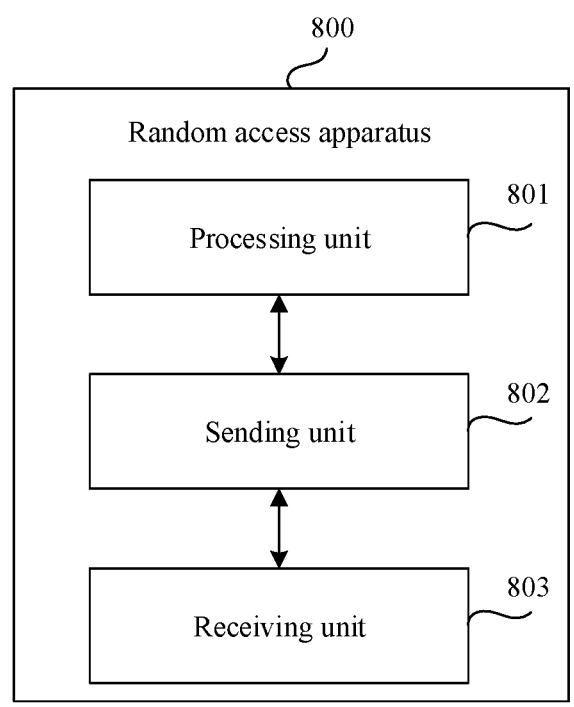
FIG. 8 is a schematic diagram of another random access apparatus according to an embodiment of this application.

In another possible implementation, an embodiment of this application further provides a random access apparatus 800. The random access apparatus 800 may be applied to a network device. FIG. 8 is a schematic structural diagram of the random access apparatus 800 according to an embodiment of this application. Referring to FIG. 8, the random access apparatus 800 includes a processing unit 801, a sending unit 802, and a receiving unit 803. The sending unit 802 is configured to send a configuration information element, where the configuration information element is used to indicate an association relationship between an SSB and an RO. The sending unit 802 sends first indication information when the processing unit 801 determines that the association relationship between an SSB and an RO is that one SSB corresponds to a plurality of ROs; and/or the sending unit 802 sends second indication information to a terminal when the processing unit 801 determines that the association relationship between an SSB and an RO is that a plurality of SSBs correspond to one RO, where the first indication information and/or the second indication information is used to determine a first RO for sending a preamble. The receiving unit 803 is configured to receive the random access preamble sent via the first RO.

The first indication information used in the random access apparatus 700 and the random access apparatus 800 is used to indicate at least one RO of a plurality of ROs corresponding to one SSB.

Specifically, the first indication information may be a mask index. Alternatively, the first indication information includes a plurality of bits, each bit corresponds to one of a plurality of ROs, and a value of each bit is used to indicate whether a RO that corresponds to the each bit is used to send a preamble.

In a possible implementation, different RO masks may be configured for different association relationships between an SSB and an RO. The RO mask may include a correspondence between a value of the first indication information and a first RO. In an embodiment of this application, each of correspondences between values of the first indication information and first ROs in different RO masks may be referred to as a first correspondence. A first RO is determined based on the first correspondence. The mask index may be a value of the first indication information in the first correspondence.

A correspondence between a value of the first indication information and an RO in the first correspondence is as follows:

when one SSB corresponds to eight ROs, the value of the first indication information is a value of three bits, and each value is used to indicate one RO; or the mask index is a value of four bits, where eight values are used to indicate eight ROs, one value is used to indicate that any RO can be selected from all ROs corresponding to the SSB, one value is used to indicate an odd-numbered RO, one value is used to indicate an even-numbered RO, and other values are reserved;

when one SSB corresponds to four ROs, the value of the first indication information is a value of two bits, and each value is used to indicate one RO; or the mask index is a value of three bits, where four values are used to indicate four ROs, one value is used to indicate that any RO can be selected from all ROs corresponding to the SSB, one value is used to indicate an odd-numbered RO, one value is used to indicate an even-numbered RO, and the other value is reserved; or when one SSB corresponds to two ROs, the value of the first indication information is a value of one bit, and each value is used to indicate one RO; or the mask index is a value of two bits, where two values are used to indicate two ROs, one value is used to indicate that any RO can be selected from all ROs corresponding to the SSB, and the other value is reserved.

In another possible example, a same RO mask may be configured for different association relationships between an SSB and an RO. The RO mask may include a correspondence between a value of the first indication information and a first RO. In an embodiment of this application, a correspondence between a value of the first indication information and a first RO in the same RO mask may be referred to as a second correspondence. The mask index may be a value of the first indication information in the second correspondence.

A correspondence between a value of the first indication information and a first RO in the second correspondence is as follows:

the first indication information is a value of four-bit information, where one value is used to indicate that any RO can be selected from all ROs corresponding to the SSB, two values are used to indicate two ROs in two ROs corresponding to the SSB, two values are reserved or are used to indicate two ROs other than the two ROs in four ROs corresponding to the SSB, two values are reserved or are used to indicate four ROs other than the four ROs in eight ROs corresponding to the SSB, one value is used to indicate an odd-numbered RO in the four or eight ROs corresponding to the SSB, one value is used to indicate an even-numbered RO in the four or eight ROs corresponding to the SSB, and other values are reserved; or the first indication information is a value of three bits, where one value is used to indicate that any RO can be selected from all ROs corresponding to the SSB, two values are used to indicate two ROs in two ROs corresponding to the SSB, two values are reserved or are used to indicate two ROs other than the two ROs in four ROs corresponding to the SSB, and two values are reserved or are used to indicate four ROs other than the four ROs in eight ROs corresponding to the SSB.

In the embodiments of this application, different or same random access masks are configured for different association relationships between an SSB and an RO, so that an RO for an SSB can be indicated by using a random access mask. Further, because all SSBs have a same RO association relationship, in an embodiment of this application, an RO for all SSBs may be indicated by using a random access mask configuration corresponding to one SSB.

In another possible implementation, in an embodiment of this application, the second indication information may be used to indicate at least one SSB of a plurality of SSBs corresponding to one RO. Determining the first random access occasion based on the second indication information includes: determining a first SSB based on the second indication information; and determining an RO corresponding to the first SSB as the first RO.

The second indication information includes a plurality of bits, each bit corresponds to one of the plurality of downlink signals, and a value of each bit is used to indicate whether a random access occasion corresponding to a downlink signal that corresponds to the each bit is used to send a random access preamble; or the second indication information is at least one value of N-bit information, and a plurality of values of the N-bit information are used to indicate the plurality of downlink signals.

In the embodiment of this application, when the association relationship between an SSB and an RO is that a plurality of SSBs corresponds to one RO, the second indication information indicating the at least one SSB of the plurality of SSBs may be used to determine the first SSB in the plurality of SSBs, and the RO corresponding to the determined first SSB is used as the first RO to send a preamble. In addition, the terminal may determine the first SSB that is to be indicated to the network device. msg2 is to be delivered via a corresponding first SSB, where the first SSB is specified by the network device. The specified first SSB may be a first SSB with light load, relatively little interference, and good quality, to facilitate quick access.

In still another possible implementation, K preambles are sent via K ROs, and K is a positive integer greater than or equal to 2.

When one SSB corresponds to the K ROs, the first indication information is used to indicate the K first ROs, where the first indication information includes K mask indexes corresponding to the K first ROs; or the first indication information includes a plurality of bits, each bit corresponds to one of a plurality of ROs, a value of each bit is used to indicate whether a RO that corresponds to the each bit is used to send a random access preamble, and values of K bits in the plurality of bits indicate that ROs that correspond to the K bits are used to send preambles.

When the K first ROs are associated with M SSBs, where M is a positive integer greater than or equal to 2, the K first ROs are determined based on the first indication information and the second indication information.

Further, the second indication information may include a plurality of bits, each bit corresponds to one of a plurality of SSBs, a value of each bit is used to indicate whether an RO corresponding to a SSB that corresponds to the each bit is used to send a preamble, where values of M bits in the plurality of bits are used to indicate that ROs corresponding to SSBs that correspond to the M bits are used to send preambles. The first indication information may include a plurality of bits, each bit corresponds to one of a plurality of ROs, a value of each bit is used to indicate whether a RO that corresponds to the each bit is used to send a preamble, and values of K/M bits in the plurality of bits indicate that ROs that correspond to the K/M bits are used to send preambles.

It should be understood that division into the units in the apparatuses is merely logical function division. In an actual implementation, all or some of the units may be integrated into a physical device, or may be physically separated. In addition, all the units in the apparatuses may be implemented in a form of software invoked by a processing element, or may be implemented in a form of hardware; or some units may be implemented in a form of software invoked by a processing element, and some units may be implemented in a form of hardware. For example, in an implementation, each unit may be a separately disposed processing element, or may be integrated into a chip of the apparatus. Alternatively, each unit may be stored in a memory in a form of a program to be invoked by a processing element of the apparatus to perform a function of the unit. In addition, these units may be all or partially integrated, or may be implemented independently. The processing element herein may also be referred to as a processor, and may be an integrated circuit having a signal processing capability. In an implementation process, steps of the foregoing methods or the foregoing units may be implemented via a hardware integrated logic circuit in the processing element, or may be implemented in a form of software invoked by the processing element.

In an example, a unit in any one of the foregoing apparatuses may be one or more integrated circuits configured to implement the foregoing methods, for example, one or more specific integrated circuits (ASICs), one or more microprocessors (digital signal processors, or DSPs), one or more field programmable gate arrays (FPGAs), or a combination of at least two of these types of integrated circuits. For another example, when a unit in the apparatuses is implemented by scheduling a program by a processing element, the processing element may be a general-purpose processor, for example, a central processing unit (CPU) or another processor that can invoke the program. For still another example, the units may be integrated and implemented in a form of a system on a chip (SOC).

The foregoing receiving unit is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a manner of a chip, the sending unit is an interface circuit that is of the chip and that is configured to send a signal from another chip or apparatus.

Figure 9:
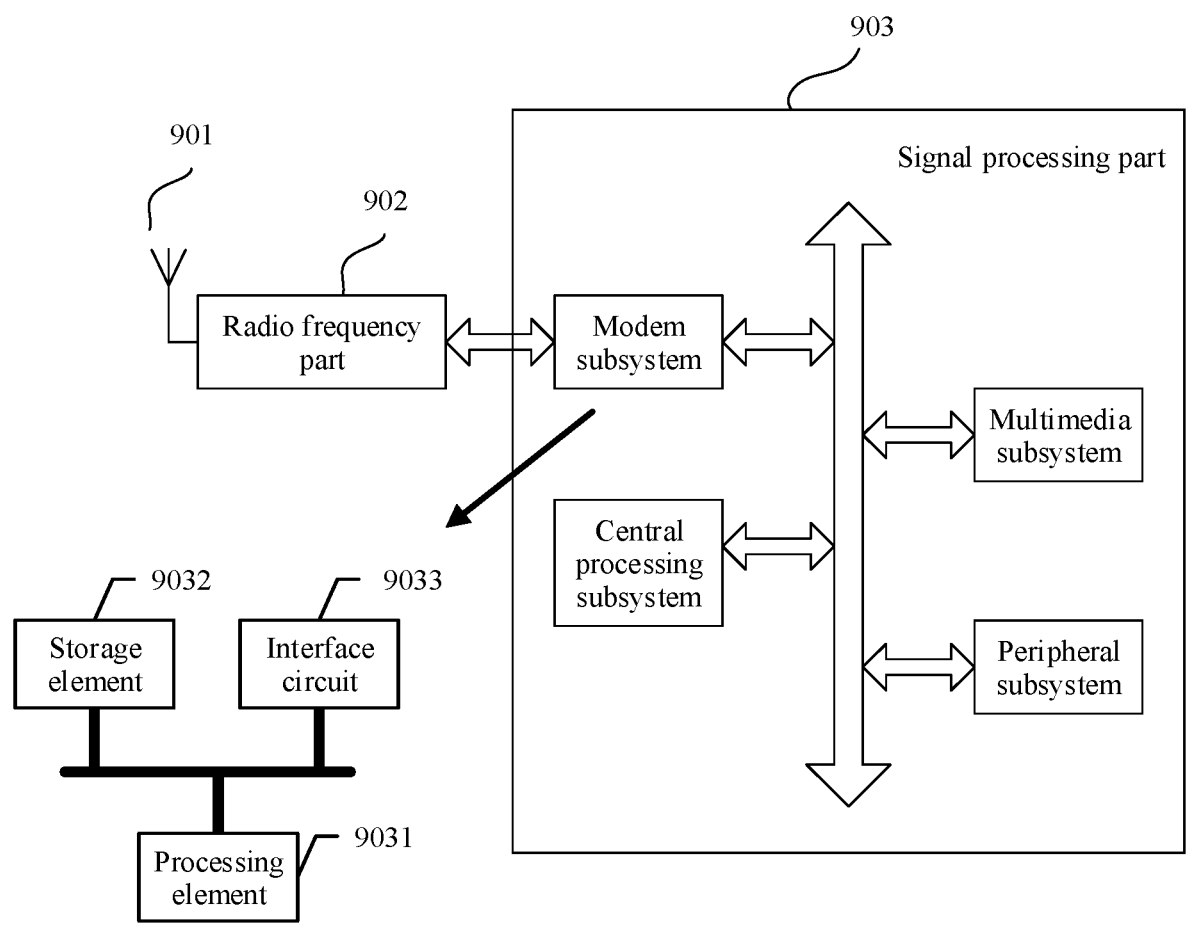
FIG. 9 is a schematic diagram of a terminal according to an embodiment of this application.

FIG. 9 is a schematic structural diagram of a terminal according to an embodiment of this application. The terminal may be the terminal in the foregoing embodiments, configured to implement operations of the terminal in the foregoing embodiments. As shown in FIG. 9, the terminal includes an antenna 901, a radio frequency part 902, and a signal processing part 903. The antenna 901 is connected to the radio frequency part 902. In a downlink direction, the radio frequency part 902 receives, via the antenna 901, information sent by a network device, and sends, to the signal processing part 903 for processing, the information sent by the network device. In an uplink direction, the signal processing part 903 processes information about the terminal, and sends the information about the terminal to the radio frequency part 902. The radio frequency part 902 processes the information about the terminal, and then sends the processed information about the terminal to the network device via the antenna 901.

The signal processing part 903 may include a modem subsystem, configured to process data at each communications protocol layer. The terminal may further include a central processing subsystem, configured to implement processing of an operating system and an application layer of the terminal. In addition, The terminal may further include another subsystem, for example, a multimedia subsystem or a peripheral subsystem. The multimedia subsystem is configured to control a camera or a screen display of the terminal, and the peripheral subsystem is configured to implement a connection to another device. The modem subsystem may be a separately disposed chip. Optionally, the foregoing apparatus used for the terminal may be located in the modem subsystem.

The modem subsystem may include one or more processing elements 9031, for example, include one main control CPU and another integrated circuit. In addition, the modem subsystem may further include a storage element 9032 and an interface circuit 9033. The storage element 9032 is configured to store data and a program. However, the program used to perform the methods performed by the terminal in the foregoing methods may not be stored in the storage element 9032, but is stored in a memory outside the modem subsystem, and is loaded and used by the modem subsystem when to be used. The interface circuit 9033 is configured to communicate with another subsystem. The foregoing apparatus used for the terminal may be located in the modem subsystem. The modem subsystem may be implemented via a chip. The chip includes at least one processing element and an interface circuit. The processing element is configured to perform the steps of any method performed by the terminal. The interface circuit is configured to communicate with another apparatus. In an implementation, units of the terminal that implement the steps in the foregoing methods may be implemented by a processing element scheduling a program. For example, an apparatus applied to the terminal includes a processing element and a storage element. The processing element invokes a program stored in the storage element, to perform the methods performed by the terminal in the foregoing method embodiments. The storage element may be a storage element located on a same chip as the processing element, that is, an on-chip storage element.

In another implementation, the program used to perform the methods performed by the terminal in the foregoing methods may be in a storage element located on a different chip from the processing element, that is, an off-chip storage element. In this case, the processing element invokes or loads the program from the off-chip storage element to the on-chip storage element, to invoke and perform the methods performed by the terminal in the foregoing method embodiments.

In still another implementation, units that implement the steps in the foregoing methods and that are in the apparatus applied to the terminal may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal that implement the steps in the foregoing methods may be integrated together, and implemented in a form of a system on a chip (SOC). The SOC chip is configured to implement the foregoing methods. At least one processing element and a storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing implementations, functions of some units are implemented by a processing element invoking a program, and functions of some units are implemented by an integrated circuit.

It can be learned that the foregoing apparatus applied to the terminal may include at least one processing element and an interface circuit. The at least one processing element is configured to perform any method performed by the terminal provided in the foregoing method embodiments. The processing element may perform some or all steps performed by the terminal in the foregoing method embodiments, in a first manner, to be specific, by executing the program stored in the storage element, or may perform some or all steps performed by the terminal in the foregoing method embodiments, in a second manner, to be specific, via the hardware integrated logical circuit in the processor element in combination with instructions. Certainly, the processing element may perform, by combining the first manner and the second manner, some or all steps performed by the terminal in the foregoing method embodiments.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of these types of integrated circuits.

The storage element may be one memory, or may be a general name of a plurality of storage elements.

Figure 10:
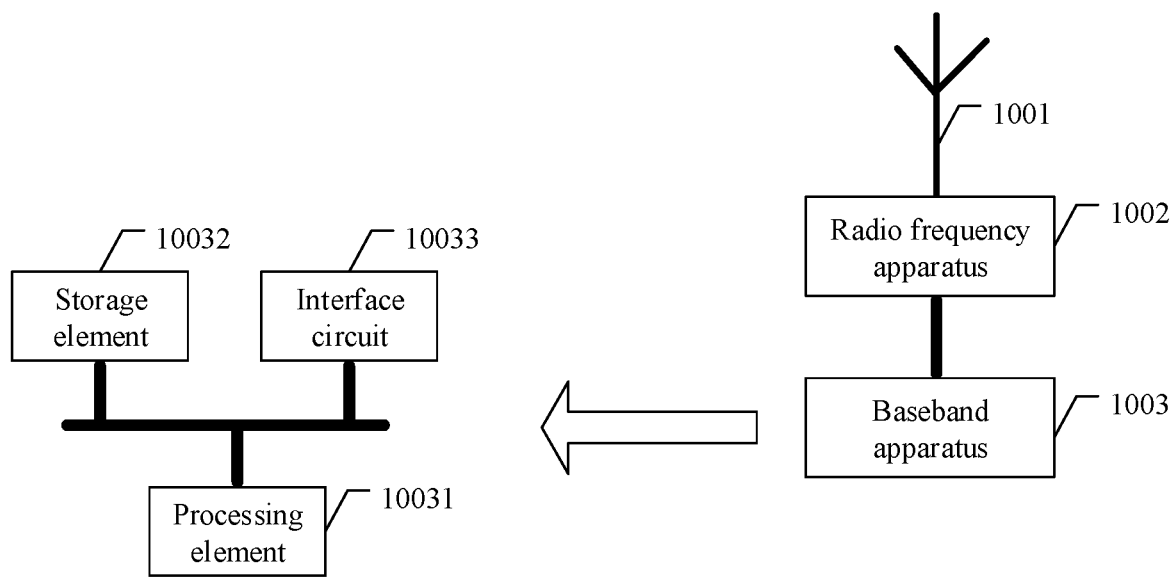
FIG. 10 is a schematic diagram of a network device according to an embodiment of this application.

FIG. 10 is a schematic structural diagram of a network device according to an embodiment of this application. The network device is configured to implement operations of the network device in the foregoing embodiments. As shown in FIG. 10, the network device includes an antenna 1001, a radio frequency apparatus 1002, and a baseband apparatus 1003. The antenna 1001 is connected to the radio frequency apparatus 1002. In an uplink direction, the radio frequency apparatus 1002 receives, via the antenna 1001, information sent by a terminal, and sends, to the baseband apparatus 1003 for processing, the information sent by the terminal. In a downlink direction, the baseband apparatus 1003 processes information about the terminal, and sends the information to the radio frequency apparatus 1002. The radio frequency apparatus 1002 processes the information about the terminal, and then sends the processed information to the terminal via the antenna 1001.

The baseband apparatus 1003 may include one or more processing elements 10031, for example, include a main control CPU and another integrated circuit. In addition, the baseband apparatus 1003 may further include a storage element 10032 and an interface circuit 10033. The storage element 10032 is configured to store a program and data. The interface circuit 10033 is configured to exchange information with the radio frequency apparatus 1002, and the interface circuit is, for example, a common public radio interface (CPRI). The foregoing apparatus applied to the network device may be located in the baseband apparatus 1003. For example, the foregoing apparatus applied to the network device may be a chip in the baseband apparatus 1003. The chip includes at least one processing element and an interface circuit. The processing element is configured to perform the steps of any method performed by the network device. The interface circuit is configured to communicate with another apparatus. In an implementation, units of the network device that implement the steps in the foregoing methods may be implemented by a processing element scheduling a program. For example, an apparatus applied to the network device includes a processing element and a storage element. The processing element invokes a program stored in the storage element, to perform the methods performed by the network device in the foregoing method embodiments. The storage element may be a storage element located on a same chip as the processing element, that is, an on-chip storage element, or may be a storage element located on a different chip from the processing element, that is, an off-chip storage element.

In another implementation, units that implement the steps in the foregoing methods and that are in the apparatus applied to the network device may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the foregoing methods may be integrated together, and implemented in a form of a system on a chip (SOC). The baseband apparatus includes the SOC chip, configured to implement the foregoing methods. At least one processing element and a storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units are implemented by a processing element invoking a program, and functions of some units are implemented by an integrated circuit.

It can be learned that the foregoing apparatus applied to the network device may include at least one processing element and an interface circuit. The at least one processing element is configured to perform any method performed by the network device provided in the foregoing method embodiments. The processing element may perform some or all steps performed by the network device in the foregoing method embodiments, in a first manner, to be specific, by executing the program stored in the storage element, or may perform some or all steps performed by the network device in the foregoing method embodiments, in a second manner, to be specific, via the hardware integrated logical circuit in the processor element in combination with instructions. Certainly, the processing element may perform, by combining the first manner and the second manner, some or all steps performed by the network device in the foregoing method embodiments.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of these types of integrated circuits.

The storage element may be one memory, or may be a general name of a plurality of storage elements.

According to the methods provided in the embodiments of this application, the embodiments of this application further provide a communications system, where the communications system includes the foregoing network device and one or more terminals.

The embodiments of this application further provide a random access apparatus, applied to a network device or a terminal, and including at least one processing element (or chip) configured to perform the foregoing method embodiments.

This application provides a random access program. When being executed by a processor, the program is used to perform the methods in the foregoing embodiments.

This application further provides a program product, for example, a computer-readable storage medium, including a program related to the foregoing random access methods.

Further embodiments of the present disclosure are provided in the following. It should be noted that the numbering used in the following section does not necessarily need to comply with the numbering used in the previous sections.

Embodiment 1. A method, comprising:
receiving a configuration information element from a network device, wherein the configuration information element indicates a quantity of downlink signals per random access occasion;
obtaining first indication information, wherein the first indication information indicates at least one random access occasion in a plurality of random access occasions corresponding to a first downlink signal in a correspondence between a downlink signal and a random access occasion, and the correspondence is determined based on the configuration information element; and
sending a random access preamble via a first random access occasion in the at least one random access occasion indicated by the first indication information.

Embodiment 2. The method according to embodiment 1, wherein the method further comprises:
obtaining second indication information, wherein the second indication information indicates the first downlink signal, wherein the first random access occasion is a random access occasion that is corresponding to the first downlink signal indicated by the second indication information and is of the at least one random access occasion indicated by the first indication information.

Embodiment 3. The method according to embodiment 1, wherein the first indication information comprises a mask index.

Embodiment 4. The method according to embodiment 3, wherein the mask index has a 4-bit value, wherein:
eight values of the mask index respectively indicate eight random access occasions;
one value indicates all random access occasions corresponding to the first downlink signal, wherein the first random access occasion is selected from the all random access occasions;
one value is used to indicate odd-numbered random access occasions, wherein the first random access occasion is selected from the odd-numbered random access occasions;
one value is used to indicate even-numbered random access occasions, wherein the first random access occasion is selected from the even-numbered random access occasions; and
other values are reserved.

Embodiment 5. The method according to embodiment 1, wherein the first indication information is sent via an information element in radio resource control (RRC) signaling, or via a physical downlink control channel (PDCCH) order.

Embodiment 6. The method according to embodiment 1, wherein the downlink signal is a synchronization signal block (SSB).

Embodiment 7. The method according to embodiment 1, wherein the quantity of downlink signals per random access occasion is greater than 1, less than 1, or equal to 1.

Embodiment 8. The method according to embodiment 1, wherein the receiving a configuration information element from a network device comprises:
receiving a configuration message from the network device, wherein the configuration message comprises the configuration information element.

Embodiment 9. The method according to embodiment 8, wherein the configuration message further comprises a first configuration information element and a second configuration information element, wherein the first configuration information element and the second configuration information element respectively indicate a time domain position and a frequency domain position of a random access resource.

Embodiment 10. A method, comprising:

sending a configuration information element, wherein the configuration information element indicates a quantity of downlink signals per random access occasion;

sending first indication information, wherein the first indication information indicates at least one random access occasion in a plurality of random access occasions corresponding to a first downlink signal in a correspondence between a downlink signal and a random access occasion, and the correspondence is determined based on the configuration information element; and receiving a random access preamble sent via a first random access occasion in the at least one random access occasion indicated by the first indication information.

Embodiment 11. The method according to embodiment 10, wherein the method further comprises:

sending second indication information, wherein the second indication information indicates the first downlink signal, wherein the first random access occasion is a random access occasion that is corresponding to the first downlink signal indicated by the second indication information and is of the at least one random access occasion indicated by the first indication information.

Embodiment 12. The method according to embodiment 10, wherein the first indication information comprises a mask index.

Embodiment 13. The method according to embodiment 12, wherein the mask index has a 4-bit value, wherein:

eight values of the mask index respectively indicate eight random access occasions;

one value indicates all random access occasions corresponding to the first downlink signal, wherein the first random access occasion is selected from the all random access occasions;

one value is used to indicate odd-numbered random access occasions, wherein the first random access occasion is selected from the odd-numbered random access occasions;

one value is used to indicate even-numbered random access occasions, wherein the first random access occasion is selected from the even-numbered random access occasions; and other values are reserved.

Embodiment 14. The method according to embodiment 11, wherein the first indication information is sent via an information element in radio resource control (RRC) signaling, or via a physical downlink control channel (PDCCH) order.

Embodiment 15. The method according to embodiment 10, wherein the first downlink signal is a synchronization signal block (SSB).

Embodiment 16. The method according to embodiment 10, wherein the quantity of downlink signals per random access occasion is greater than 1, less than 1, or equal to 1.

Embodiment 17. The method according to embodiment 10, wherein the sending a configuration information element comprises:

sending a configuration message, wherein the configuration message comprises the configuration information element.

Embodiment 18. The method according to embodiment 17, wherein the configuration message further comprises a first configuration information element and a second configuration information element, wherein the first configuration information element and the second configuration information element respectively indicate a time domain position and a frequency domain position of a random access resource.

Embodiment 19. An apparatus, comprising at least one processor, configured to invoke a program stored in a memory, wherein the program, when executed by the processor, causes the apparatus to perform the method of any one of embodiments 1 to 9.

Embodiment 20. An apparatus, comprising at least one processor, configured to invoke a program stored in a memory, wherein the program, when executed by the processor, causes the apparatus to perform the method of any one of embodiments 10 to 18.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of another programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operation steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Definitely, a person skilled in the art can make various modifications and variations to embodiments of this application without departing from the scope of this application. This application is intended to cover these modifications and variations provided that they fall within the scope of protection defined by the following claims and their equivalent technologies.

What is claimed is:

1. A method, comprising:
receiving a configuration information element from a network device, wherein the configuration information element indicates a quantity of downlink signals per random access occasion;
obtaining a first indication, wherein the first indication indicates a first downlink signal; and
sending a random access preamble via a first random access occasion, wherein a correspondence exists between the first downlink signal and the first random access occasion based on the configuration information element, and the first random access occasion is a random access occasion corresponding to the first downlink signal indicated by the first indication.

2. The method according to claim 1, further comprising:
obtaining a second indication, wherein the second indication indicates at least one random access occasion in a plurality of random access occasions corresponding to the first downlink signal, wherein the first random access occasion is a random access occasion that is corresponding to the first downlink signal indicated by the first indication and is of the at least one random access occasion indicated by the second indication.

3. The method according to claim 2, wherein the second indication comprises a mask index.

4. The method according to claim 3, wherein the mask index has a 4-bit value, wherein:
eight values of the mask index respectively indicate eight random access occasions;
one value of the eight values indicates all random access occasions corresponding to the first downlink signal, wherein the first random access occasion is selected from the all random access occasions;
one value of the eight values is used to indicate odd-numbered random access occasions, wherein the first random access occasion is selected from the odd-numbered random access occasions;
one value of the eight values is used to indicate even-numbered random access occasions, wherein the first random access occasion is selected from the even-numbered random access occasions; and
other values of the eight values are reserved.

5. The method according to claim 2, wherein the second indication is received via an information element in radio resource control (RRC) signaling, or via a physical downlink control channel (PDCCH) order.

6. The method according to claim 1, wherein the first downlink signal is a synchronization signal block (SSB).

7. The method according to claim 1, wherein the quantity of downlink signals per random access occasion is greater than 1, less than 1, or equal to 1.

8. The method according to claim 1, wherein the receiving the configuration information element from the network device comprises:
receiving a configuration message from the network device, wherein the configuration message comprises the configuration information element.

9. The method according to claim 8, wherein the configuration message further comprises a first configuration information element and a second configuration information element, wherein the first configuration information element indicates a time domain position of a given random access resource and the second configuration information element indicates a frequency domain position of the given random access resource.

10. A method, comprising:
sending a configuration information element, wherein the configuration information element indicates a quantity of downlink signals per random access occasion;
sending a first indication, wherein the first indication indicates a first downlink signal; and
receiving a random access preamble via a first random access occasion, wherein a correspondence exists between the first downlink signal and the first random access occasion based on the configuration information element, and the first random access occasion is a random access occasion corresponding to the first downlink signal.

11. The method according to claim 10, further comprising:
sending a second indication, wherein the second indication indicates at least one random access occasion in a plurality of random access occasions corresponding to the first downlink signal, wherein the first random access occasion is a random access occasion that is corresponding to the first downlink signal indicated by the first indication and is of the at least one random access occasion indicated by the second indication.

12. An apparatus, comprising:
a memory storing a program; and
at least one processor configured to invoke the program stored in the memory, wherein the program, when executed by the processor, causes the apparatus to:
receive a configuration information element from a network device, wherein the configuration information element indicates a quantity of downlink signals per random access occasion;
obtain a first indication, wherein the first indication indicates a first downlink signal; and
send a random access preamble via a first random access occasion, wherein a correspondence exists between the first downlink signal and the first random access occasion based on the configuration information element, and the first random access occasion is a random access occasion corresponding to the first downlink signal indicated by the first indication.

13. The apparatus according to claim 12, wherein the program being executed by the processor further causes the apparatus to:
obtain a second indication, wherein the second indication indicates at least one random access occasion in a plurality of random access occasions corresponding to the first downlink signal, wherein the first random access occasion is a random access occasion that is corresponding to the first downlink signal indicated by the first indication and is of the at least one random access occasion indicated by the second indication.

14. The apparatus according to claim 13, wherein the second indication comprises a mask index.

15. The apparatus according to claim 14, wherein the mask index has a 4-bit value, wherein:
eight values of the mask index respectively indicate eight random access occasions;
one value of the eight values indicates all random access occasions corresponding to the first downlink signal, wherein the first random access occasion is selected from the all random access occasions;

one value of the eight values is used to indicate odd-numbered random access occasions, wherein the first random access occasion is selected from the odd-numbered random access occasions;

one value of the eight values is used to indicate even-numbered random access occasions, wherein the first random access occasion is selected from the even-numbered random access occasions; and other values of the eight values are reserved.

16. The apparatus according to claim 13, wherein the second indication is received via an information element in radio resource control (RRC) signaling, or via a physical downlink control channel (PDCCH) order.

17. The apparatus according to claim 12, wherein the first downlink signal is a synchronization signal block (SSB).

18. The apparatus according to claim 12, wherein the quantity of downlink signals per random access occasion is greater than 1, less than 1, or equal to 1.

19. The apparatus according to claim 12, wherein the configuration information element is received from the network device via a configuration message.

20. The apparatus according to claim 19, wherein the configuration message further comprises a first configuration information element and a second configuration information element, wherein the first configuration information element indicates a time domain position of a given random access resource and the second configuration information element indicates a frequency domain position of the given random access resource.

21. An apparatus, comprising:
a memory storing a program; and
at least one processor configured to invoke the program stored in the memory, wherein the program, when executed by the processor, causes the apparatus to:
send a configuration information element, wherein the configuration information element indicates a quantity of downlink signals per random access occasion;
send a first indication, wherein the first indication indicates a first downlink signal; and
receive a random access preamble via a first random access occasion, wherein a correspondence exists between the first downlink signal and the first random access occasion based on the configuration information element, and the first random access occasion is a random access occasion corresponding to the first downlink signal.

22. The apparatus according to claim 21, wherein the program being executed by the processor further causes the apparatus to:
send a second indication, wherein the second indication indicates at least one random access occasion in a plurality of random access occasions corresponding to the first downlink signal, wherein the first random access occasion is a random access occasion that is corresponding to the first downlink signal indicated by the first indication and is of the at least one random access occasion indicated by the second indication.

23. A non-transitory computer-readable storage medium storing a program, wherein when the program is executed by a processor, the processor is caused to perform:
receiving a configuration information element from a network device, wherein the configuration information element indicates a quantity of downlink signals per random access occasion;
obtaining a first indication, wherein the first indication indicates a first downlink signal; and
sending a random access preamble via a first random access occasion, wherein a correspondence exists between the first downlink signal and the first random access occasion based on the configuration information element, and the first random access occasion is a random access occasion corresponding to the first downlink signal indicated by the first indication.

* * * * *